US010990339B2

(12) United States Patent
Park et al.

(10) Patent No.: US 10,990,339 B2
(45) Date of Patent: Apr. 27, 2021

(54) ELECTRONIC DEVICE HAVING PLURALITY OF DISPLAY PANELS, FIRST AND SECOND PANELS DISPLAY IMAGES INSIDE THE HOUSING AND THIRD DISPLAY PANEL CONNECTING TO EXTERNAL INTERFACE PORT

(71) Applicant: Samsung Electronics Co., Ltd, Suwon-si (KR)

(72) Inventors: Cha-Hoon Park, Seoul (KR); Sung-Geun Joo, Suwon-si (KR); Ga-Young Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/163,414

(22) Filed: Oct. 17, 2018

(65) Prior Publication Data
US 2019/0114133 A1  Apr. 18, 2019

(30) Foreign Application Priority Data
Oct. 17, 2017  (KR) .......................... 10-2017-0134785

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1601* (2013.01); *G06F 1/1632* (2013.01); *G06F 1/1669* (2013.01); *G06F 1/1692* (2013.01); *G06F 3/04817* (2013.01); *G06F 3/04886* (2013.01); *G06F 3/1431* (2013.01); *G06F 3/1454* (2013.01); *G06F 3/04842* (2013.01);
(Continued)

(58) Field of Classification Search
CPC .... G06F 1/1618; G06F 1/1616; G06F 3/0483; G06F 3/1454; G06F 3/1423; G06F 3/1431
See application file for complete search history.

(56) References Cited

U.S. PATENT DOCUMENTS 5,764,201 A * 6/1998 Ranganathan ........ G06F 3/1423
345/3.3
6,049,316 A * 4/2000 Nolan .................... G09G 5/006
345/698

(Continued)

*Primary Examiner* — Jennnifer Mehmood
*Assistant Examiner* — James S Nokham

(57) ABSTRACT

Disclosed is an electronic device and a control method therefor. The electronic device may include a housing, a processor disposed in the housing, and at least one memory disposed in the housing, connected to the processor, and storing instructions that, when executed by the processor, cause the processor to: detect connection of a plurality of displays to the processor; determine connection types of the plurality of connected displays; display a first screen according to a first mode when all of the plurality of connected displays are internal displays that are exposed via at least a part of the housing; and display a second screen according to a second mode when some of the plurality of connected displays are internal displays and the remaining displays are external displays connected to the electronic device via an interface, a part of which is exposed via the housing.

13 Claims, 41 Drawing Sheets

(51) Int. Cl.
*G06F 3/0481* (2013.01)
*G06F 3/0488* (2013.01)
*G06F 3/0484* (2013.01)

(52) U.S. Cl.
CPC ....... *G06F 3/1446* (2013.01); *G09G 2360/04* (2013.01); *G09G 2370/12* (2013.01)

(56) References Cited

U.S. PATENT DOCUMENTS

| | | | |
|---|---|---|---|
| 2007/0097014 A1* | 5/2007 | Solomon | G06F 1/1616 |
| | | | 345/1.1 |
| 2007/0271525 A1* | 11/2007 | Han | G06F 3/0346 |
| | | | 715/786 |
| 2010/0245209 A1 | 9/2010 | Miller et al. | |
| 2010/0298032 A1* | 11/2010 | Lee | G06F 1/1616 |
| | | | 455/566 |
| 2010/0302141 A1* | 12/2010 | Shankar | G06F 3/1454 |
| | | | 345/156 |
| 2010/0321275 A1* | 12/2010 | Hinckley | G06F 1/1618 |
| | | | 345/1.3 |
| 2011/0296333 A1* | 12/2011 | Bateman | G06F 3/04883 |
| | | | 715/773 |
| 2012/0176396 A1* | 7/2012 | Harper | G09G 5/373 |
| | | | 345/589 |
| 2013/0111371 A1* | 5/2013 | Reeves | G06F 3/0486 |
| | | | 715/761 |
| 2013/0328878 A1* | 12/2013 | Stahl | G06T 3/40 |
| | | | 345/428 |
| 2014/0098291 A1* | 4/2014 | Higashi | G06F 3/1454 |
| | | | 348/552 |
| 2015/0302621 A1* | 10/2015 | Liu | G06F 21/604 |
| | | | 345/647 |
| 2016/0321969 A1* | 11/2016 | Kambhatla | G09G 5/14 |

* cited by examiner

ELECTRONIC DEVICE HAVING PLURALITY OF DISPLAY PANELS, FIRST AND SECOND PANELS DISPLAY IMAGES INSIDE THE HOUSING AND THIRD DISPLAY PANEL CONNECTING TO EXTERNAL INTERFACE PORT

CROSS-REFERENCE TO RELATED APPLICATION

This application is based on and claims priority under 35 U.S.C. § 119 to Korean Patent Application No. 10-2017-0134785 filed on Oct. 17, 2017 in the Korean Intellectual Property Office, the disclosure of which is incorporated herein by reference in its entirety.

BACKGROUND

1. Field

The present disclosure relates to an electronic device equipped with a plurality of displays and a control method there for.

2. Description of the Related Art

Recently, the number of users who utilize mobile devices such as smartphones or tablet personal computers (tablet PCs) has rapidly increased. Accordingly, mobile carriers or manufacturers have come to provide various functions for improving user convenience in the mobile environment. Compared with conventional desktop computers or laptop computers, mobile devices are usually utilized while users are moving. Accordingly, the manufacturers of the mobile devices provide various functions/operations which enable users to easily use mobile devices while the users are moving.

As described above, due to the rapid propagation of mobile devices, personal computers such as conventional desktop computers and/or laptop computers tend to be manufactured to provide various functions/operations which are provided by mobile devices, or to be compatible with mobile devices. For example, various types of laptop computers have been developed, such as a convertible notebook that can also be used as a tablet PC.

SUMMARY

Recently, laptop computers capable of providing a function/operation of displaying a screen according to a tablet mode, in addition to a screen according to a desktop mode, have been developed. However, the conventional laptop computer that supports tablet mode may not support tablet mode when an external electronic device (e.g., an external display) is connected to the laptop computer. For example, when the external electronic device is connected to the laptop computer, a switch icon for switching the mode from desktop mode to tablet mode may be disactivated, or the laptop computer may automatically switch from tablet mode to desktop mode. Accordingly, in an electronic device, such as a laptop computer equipped with a plurality of displays (which may be briefly expressed as "first laptop computer" as needed in the present disclosure), a processor of the first laptop computer may determine that an external display is connected to the first laptop computer, and may not support tablet mode even though the external electronic device is not actually connected thereto. Since a conventional laptop computer is manufactured to include a single display, the systems of the conventional laptop computer (including various hardware devices and/or various pieces of software such as a basic input/output system (BIOS)) may not support the case in which the conventional laptop computer includes two or more displays. This results in at least the above-described drawback.

According to various embodiments, there is provided an electronic device equipped with a plurality of displays (e.g., a laptop computer having two displays), which can bidirectionally switch between a desktop mode and a tablet mode, whereby user convenience may be improved.

According to various embodiments, there is provided an electronic device equipped with a plurality of displays, which can support a duplication mode and an extended mode in the tablet mode, whereby user convenience may be improved.

According to various embodiments, there is provided a computer-readable recording medium, which can support switching to a tablet mode in an electronic device equipped with a plurality of displays, whereby user convenience may be improved.

According to various embodiments, there is provided a computer-readable recording medium, which can support a duplication mode and an extended mode in the tablet mode of an electronic device equipped with a plurality of displays, whereby user convenience may be improved.

An electronic device, according to various embodiments, may include a housing, a processor disposed in the housing, and at least one memory disposed in the housing and connected to the processor so as to be operable, and upon execution, the memory is configured to enable the processor to perform: detecting the connection of a plurality of displays to the processor; determining the connection types of the plurality of connected displays; based at least on a result of the determination, displaying a first screen according to a first mode in the plurality of displays when all of the plurality of connected displays are internal displays that are exposed via at least a part of the housing; and, based at least on a result of the determination, displaying a second screen according to a second mode in the plurality of displays when some of the plurality of connected displays are internal displays and the remaining displays are external displays connected to the electronic device via an interface, a part of which is exposed via the housing.

A computer-readable recoding medium, according to various embodiments, may include at least one operation, and the at least one operation may include: detecting the connection of a plurality of displays to the processor; determining the connection types of the plurality of connected displays; based at least on a result of the determination, displaying a first screen according to a first mode in the plurality of displays when all of the plurality of connected displays are internal displays, and displaying a second screen according to a second mode in the plurality of displays when some of the plurality of displays are internal displays and the remaining displays are external displays connected to the electronic device via an interface of the electronic device.

According to various embodiments, a laptop computer equipped with a plurality of displays maybe bidirectionally switched between a desktop mode and a tablet mode, whereby user convenience in the mobile communication environment may be improved.

According to various embodiments, a laptop computer equipped with a plurality of displays may support a duplication mode and an extended mode in the tablet mode, whereby user convenience may be improved.

It will be apparent to those skilled in the art that the advantages of the present disclosure are not limited to those mentioned above, and the present disclosure includes various implicit advantages.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
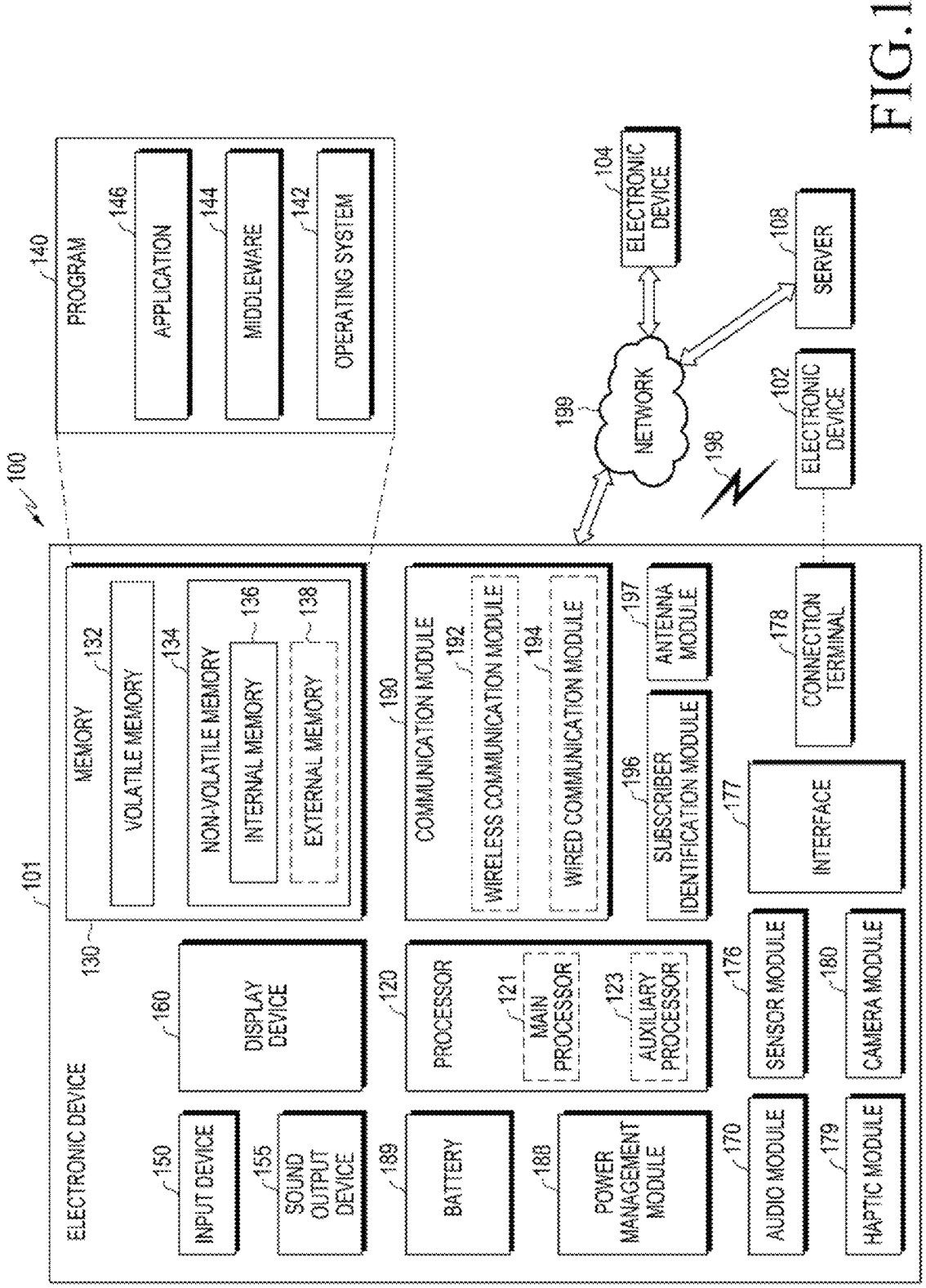
FIG. 1 is a block diagram illustrating an electronic device in a network environment according to various embodiments.

FIG. 1. illustrates an electronic device 101 in a network environment 100 according to various embodiments. Referring to FIG. 1, in the network environment 100, the electronic device 101 may communicate with an electronic device 102 via a first network 198 (e.g., short-range wireless communication), or may communicate with an electronic device 104 or a server 108 via a second network 199 (e.g., long-distance wireless communication). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to embodiments, the electronic device 101 may omit at least one element (e.g., the display device 160 or the camera module 180) from among all of the elements, or may add other elements. According to embodiments, some elements may be integrated, such as the case in which the sensor module 176 (e.g., a fingerprint sensor, an iris sensor, or an illumination sensor) is embedded in the display device 160 (e.g., a display).

The processor 120 may drive, for example, software (e.g., the program 140) so as to control at least one other element (e.g., a hardware or software element) of the electronic device 101 connected to the processor 120, and may process and perform operations on various data. The processor 120 may load commands or data received from other elements (e.g., the sensor module 176 or communication module 190) into volatile memory 132, may process the loaded command or data, and may store resultant data in non-volatile memory 134. According to an embodiment, the processor 120 may include a main processor 121 (e.g., a central processing device or an application processor) and a sub-processor 123 (e.g., a graphic processing device, an image signal processor, a sensor hub-processor, or a communication processor) which operates independently from the main processor 121, additionally or alternatively uses lower power than that of the main processor 121, or is specific to a designated function. Here, the sub-processor 123 may operate separately from the main processor 121, or may operate in the state of being embedded therein.

In this instance, the sub-processor 123 may control a function associated with at least one element (e.g., the display device 160, the sensor module 176, or the communication module 190) of the elements of the electronic device 101 or at least a part of their states, on behalf of the main processor 121 while the main processor 121 is in an inactive state (e.g., a sleep state), or together with the main processor 121 while the main processor 121 is in an active state (e.g., executing an application). According to an embodiment, the sub-processor 123 (e.g., an image signal processor or a communication processor) may be implemented as a part of another element (e.g., the camera module 180 or the communication module 190) that is functionally related thereto. The memory 130 may store various data, for example, software (e.g., the program 140), which is used by at least one element (e.g., the processor 120 or the sensor module 176) of the electronic device 101, and input data or output data associated with commands related to the at least one element. The memory 130 may include the volatile memory 132 or the non-volatile memory 134.

The program 140 may be software stored in the memory 130, and may include, for example, an operating system 142, middleware 144, or applications 146.

The input device 150 may be a device for receiving commands or data which are to be used for elements (e.g., the processor 120) of the electronic device 101, from the outside (e.g., a user) of the electronic device 101, and may include, for example, a microphone, a mouse, or a keyboard.

The sound output device 155 may be a device for outputting a sound signal to the outside of the electronic device 101, and may include, for example, a speaker which is used for general purposes, such as multimedia playback or transcription playback, and a receiver which is used for the purpose of receiving a phone call. According to an embodiment, the receiver may be configured to be integrated with a speaker or may be configured separately from a speaker.

The display device 160 is a device for visually providing information to a user of the electronic device 101, and may include, for example, a display, a hologram device, or a projector, and a control circuit for controlling the corresponding device. According to an embodiment, the display device 160 may include touch circuitry or a pressure sensor for measuring the pressure intensity of a touch.

The audio module 170 may bidirectionally convert sound and an electronic signal. According to an embodiment, the audio module 170 may obtain sound using the input device 150, or may output sound via the sound output device 155 or an external electronic device (e.g., the electronic device 102 (e.g., a speaker or a headphone) connected to the electronic device 101 in a wired or wireless manner.

The sensor module 176 may generate an electrical signal or data value corresponding to an internal operation state (e.g., power or temperature) of the electronic device 101 or an external environment state. The sensor module 176 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 177 may support a designated protocol that is connected to an external electronic device (e.g., the electronic device 102) in a wired or wireless manner. According to an embodiment, the interface 177 may include a high-definition multimedia interface (HDMI), a universal serial bus (USB) interface, an SD card interface, or an audio interface.

A connection terminal 178 may include a connector that physically connects the electronic device 101 and an external electronic device (e.g., the electronic device 102), for example, an HDMI connector, a USB connector, an SD card connector, or an audio connector (e.g., a headphone connector).

The haptic module 179 may convert an electrical signal into a mechanical stimulus (e.g., vibration or movement) or an electrical stimulus that a user can recognize via a sense of touch or movement. The haptic module 179 may include, for example, a motor, a piezoelectric effect element, or an electrostimulator.

The camera module 180 may shoot a still image and a video. According to an embodiment, the camera module 180 may include one or more lenses, an image sensor, an image signal processor, or a flash.

The power management module 188 may be a module for managing power supplied to the electronic device 101, and may be configured as, for example, at least a part of a power management integrated circuit (PMIC).

The battery 189 is a device for supplying power to at least one element of the electronic device 101, and may include, for example, a primary cell which is not rechargeable, a secondary cell which is rechargeable, or a fuel cell.

The communication module 190 may establish a wired or wireless communication channel between the electronic device 101 and an external electronic device (e.g., the electronic device 102, the electronic device 104, or the server 108), and may support communication via the established communication channel. The communication module 190 may include one or more communication processors, which operate independently from the processor 120 (e.g., an application processor) and support wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power-line communication module), and may communicate with an external electronic device via a first network 198 (e.g., a short-range communication network such as Bluetooth, Wi-Fi direct, or infrared data association (IrDA)) or a second network 199 (e.g., a long-distance communication network such as a cellular network, the Internet, or a computer network (e.g., LAN or WAN)) using a corresponding communication module among the described communication modules. The above-described various types of communication modules 190 may be implemented as one chip, or may be implemented as separate chips.

According to an embodiment, the wireless communication module 192 may identify and authenticate the electronic device 101 within a communication network using user information stored in the subscriber identification module 196.

The antenna module 197 may include one or more antennas for transmitting or receiving signals or power to/from the outside. According to an embodiment, the communication module 190 (e.g., the wireless communication module 192) may transmit a signal to an external electronic device, or may receive a signal from an external electronic device, via an antenna suitable for a communication scheme.

Some of the elements may be connected to each other via a communication scheme between neighboring devices (e.g., a bus, a general purpose input/output (GPIO) interface, a serial peripheral interface (SPI), or a mobile industry processor interface (MIPI)), and may mutually exchange signals (e.g., commands or data) therebetween.

According to an embodiment, command or data may be transmitted or received between the electronic device 101 and an external electronic device 104 via the server 108 connected to the second network 199. Each electronic device 102 and 104 may be of a type which is the same as, or different from, that of the electronic device 101. According to an embodiment, some or all of the operations executed by the electronic device 101 may be executed by another external electronic device or a plurality of external electronic devices. According to an embodiment, when the electronic device 101 has to perform some functions or services automatically or by request, the electronic device 101 may request an external electronic device to perform at least some functions relating thereto, instead of, or in addition to, performing the functions or services by itself. The external electronic device that receives the request may execute the requested function or additional function, and may transmit the result thereof to the electronic device 101. The electronic device 101 may provide the received result as it is, or may additionally process the received result so as to provide the requested functions or services. To this end, for example, cloud-computing, distributed-computing, or client-server-computing technology may be used.

Figure 2A:
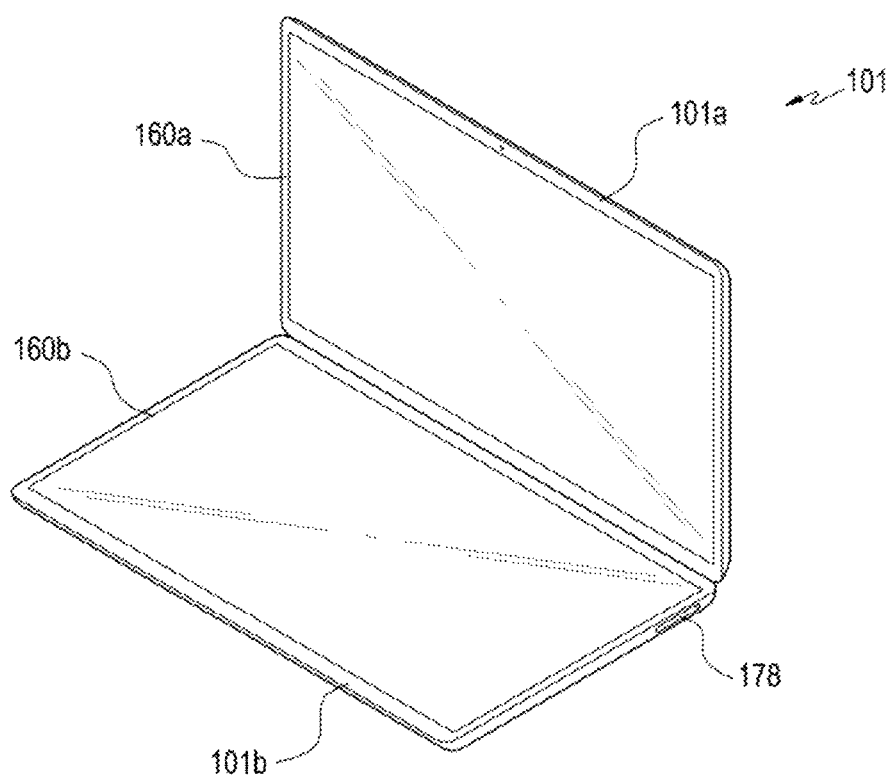
FIG. 2A is a diagram illustrating an electronic device according to various embodiments.

FIG. 2A is a diagram illustrating an electronic device according to various embodiments.

Figure 2B:
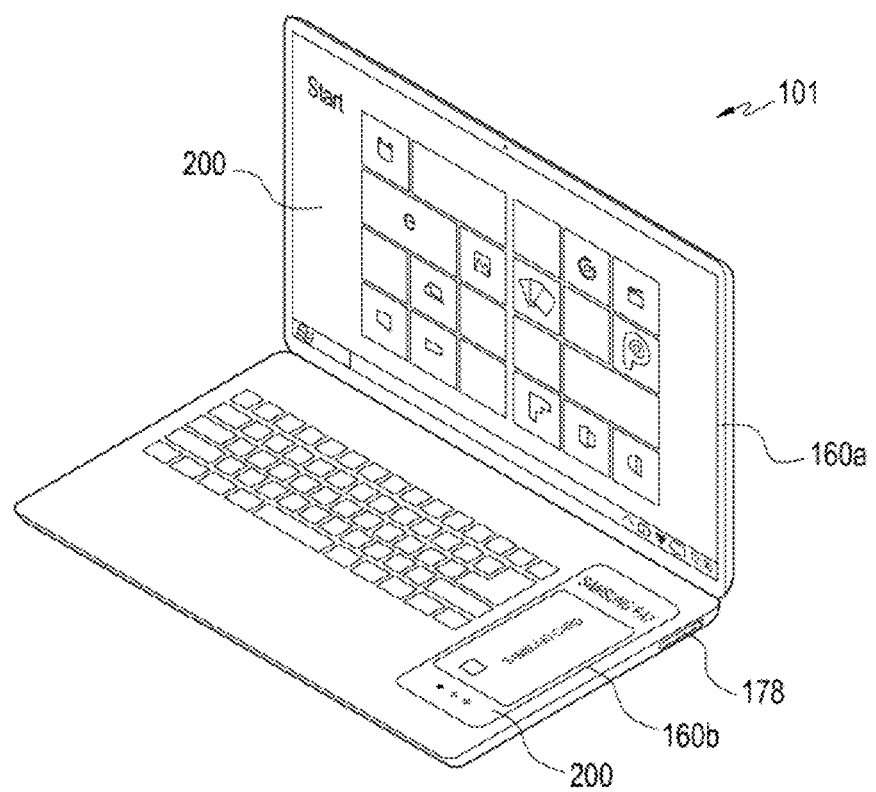
FIG. 2B is a diagram illustrating a function/functions or an operation/operations of displaying various objects in a tablet mode by an electronic device having a plurality of displays, according to various embodiments.

Referring to FIG. 2A, the electronic device 101 may include a laptop computer (e.g., a notebook) according to various embodiments. The electronic device (e.g., the electronic device 101), according to various embodiments, may include a first display 160a and a second display 160b. Each of the first display 160a and the second display 160b may include a touch circuit or a pressure sensor for receiving a touch. The first display 160a and the second display 160b may be connected to the processor, to be operated by the processor. The first display 160a may be disposed in the upper portion 101a of the electronic device 101. The second display 160b may be disposed in the lower portion 101b of the electronic device 101. The upper portion 101a and the lower portion 101b of the electronic device may be provided in a structure in which they are coupled via, for example, hinge coupling, and are foldable. The electronic device according to various embodiments may include the connection terminal 178. The connection terminal 178 may include a connector that may physically connect the electronic device 101 and an external electronic device (e.g., the electronic device 102), for example, an HDMI connector, a USB connector, an SD card connector, or an audio connector. According to various embodiments, the electronic device 101 may include a power button (not illustrated). According to various embodiments, the position and/or size of the first display 160a and/or the second display 160b may be variously modified and may be included in the electronic device 101. For example, the second display 160b may be disposed in the lower portion 101b of the electronic device 101, together with a physical keyboard, as illustrated in FIG. 2B. Alternatively, the second display 160b may be disposed on the outer side of the upper portion 101a of the electronic device 101 (i.e., the cover side of the electronic device 101). At least some embodiments may be described from the perspective of the electronic device 101 equipped with the second display 160b, which is the same size as the first display 106b and is disposed in the lower portion 101b of the electronic device 101, as illustrated in FIG. 2A. In the present disclosure, "internal display" or "integrated display" may be used in at least some embodiments, as terms serving as alternatives to or interchangeable with "first display" 160a and "second display" 160b.

FIG. 2B is a diagram illustrating a function/functions or an operation/operations of displaying various objects in a tablet mode by an electronic device having a plurality of displays, according to various embodiments.

Referring to FIG. 2B, various objects pertaining to the tablet mode may be displayed on a screen 200 that is displayed according to the tablet mode (in the present disclosure, the term "screen displayed according to the tablet mode" may be referred to as a "first screen" for ease of description), in the first display 160a and the second display 160b. For example, in the first display 160a of the electronic device 101, execution icons of various applications may be displayed. For example, in the second display 160b of the electronic device 101, an execution screen of a predetermined application (e.g., Samsung® Pay™) may be displayed. However, those are merely examples. In the first display 160a and/or the second display 160b, at least one object that was previously designated or is designated by a user setting may be displayed. As illustrated in FIG. 2B, in tablet mode, according to various embodiments, a screen according to a display scheme specialized in (i.e., suitable for) a mobile environment may be displayed, rather than a display scheme used for performing a display on a desktop computer. The tablet mode may be provided to a user via a predetermined operating system (e.g., Windows® 10). In the present disclosure, the term "desktop mode" indicates a state different from a tablet mode, or in other words, an operation mode (display mode) in the state of which tablet mode is canceled. According to various embodiments, in tablet mode, a mouse pointer (not illustrated) may be displayed, or various objects may be selected using the mouse pointer. According to various embodiments, in tablet mode, the mouse pointer may not be displayed, and various functions/ operations may be performed by a user's touch input (including an input such as a hovering gesture or the like) or various input devices (e.g., a stylus pen or the like).

Figure 2C:
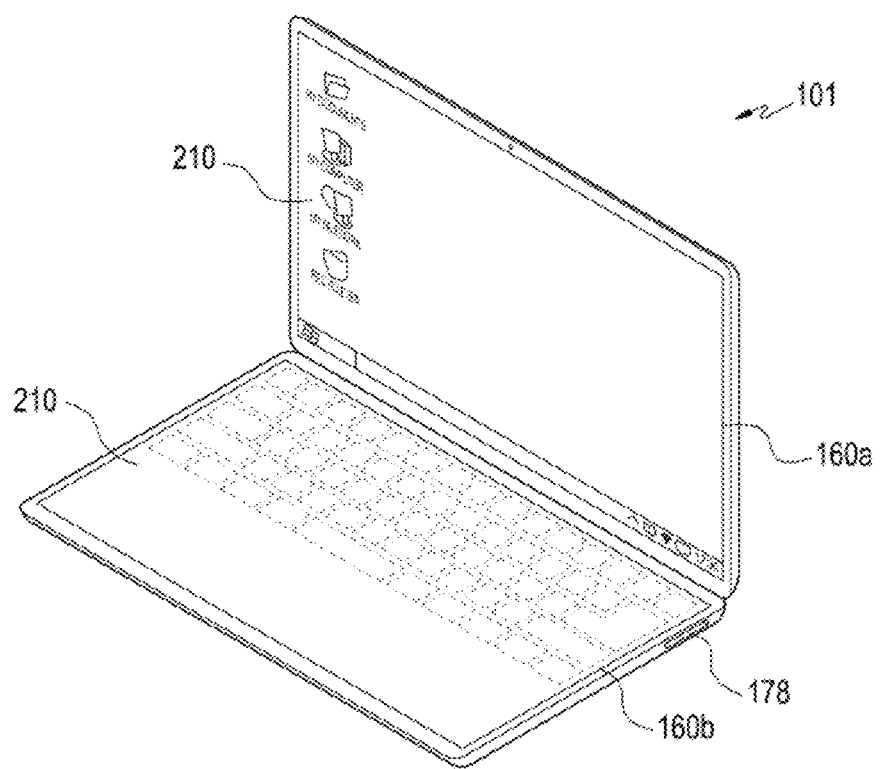
FIG. 2C is a diagram illustrating a function/functions or an operation/operations of displaying various objects in a desktop mode by an electronic device having a plurality of displays, according to various embodiments.

FIG. 2C is a diagram illustrating a function/functions or an operation/operations of displaying various objects in desktop mode by an electronic device having a plurality of displays, according to various embodiments.

Referring to FIG. 2C, in desktop mode, a screen 210 including objects pertaining to the desktop mode, the sizes and/or shapes which are changed from the various objects included in the first screen 200 (in the present disclosure, the term "screen including objects pertaining to the desktop mode" may be interchanged with "second screen" for ease of description), may be displayed in the first display 160a and the second display 160b. In the desktop mode, generally, objects included in the first screen 200 may be controlled by a mouse pointer which is controlled by a mouse. According to various embodiments, for example, a virtual keyboard may be displayed in the second display 160b. However, those are merely examples. In the first display 160a and/or the second display 160b, at least one object that is previously designated according to the desktop mode or is designated by user setting may be displayed. In desktop mode, a mouse pointer (not illustrated) may be displayed. According to various embodiments, even in desktop mode, the mouse pointer may not be displayed, and various functions/operations may be performed according to a user's touch input or input provided via various input devices.

Figure 3:
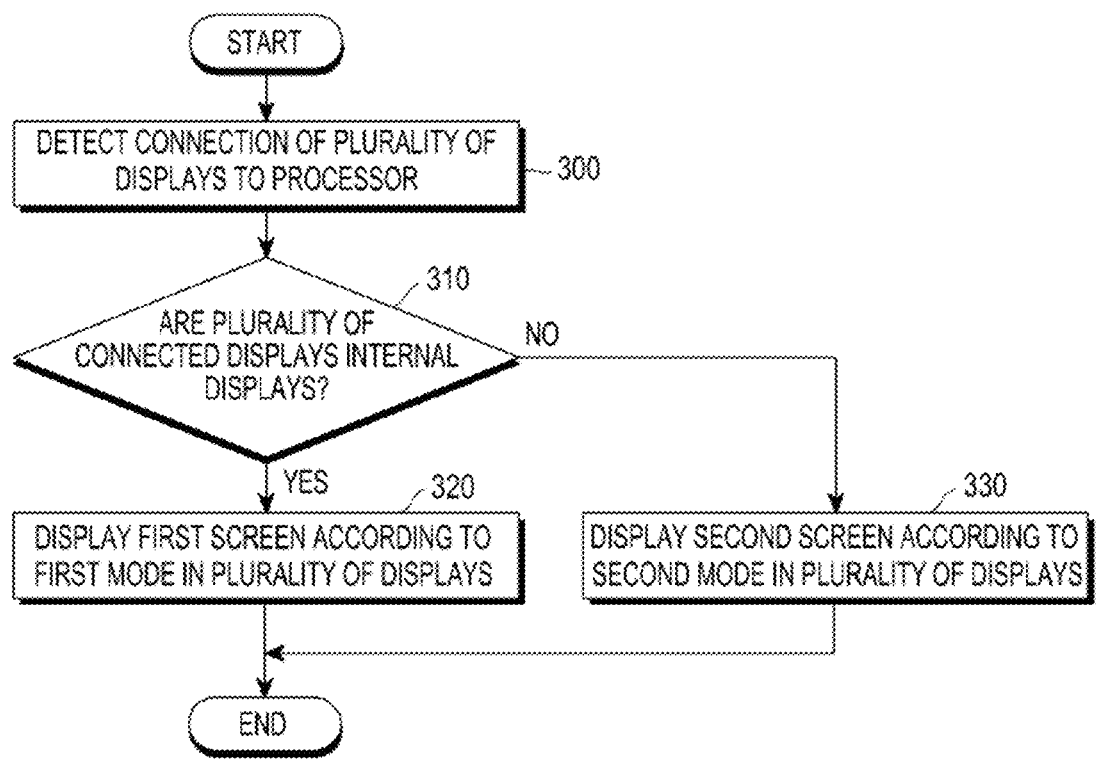
FIG. 3 is a diagram illustrating a method of operating an electronic device according to various embodiments.

FIG. 3 is a diagram illustrating a method of operating an electronic device according to various embodiments.

Referring to FIG. 3, according to various embodiments, the electronic device 101 (e.g., the processor 120 of FIG. 1) may detect connection of a plurality of displays to the processor 120 in operation 300.

According to various embodiments, in operation 300, the plurality of displays may include an internal display and an external electronic device (e.g., the electronic device 102 of FIG. 1) (e.g., a monitor) connected to the electronic device 101.

Figure 4:
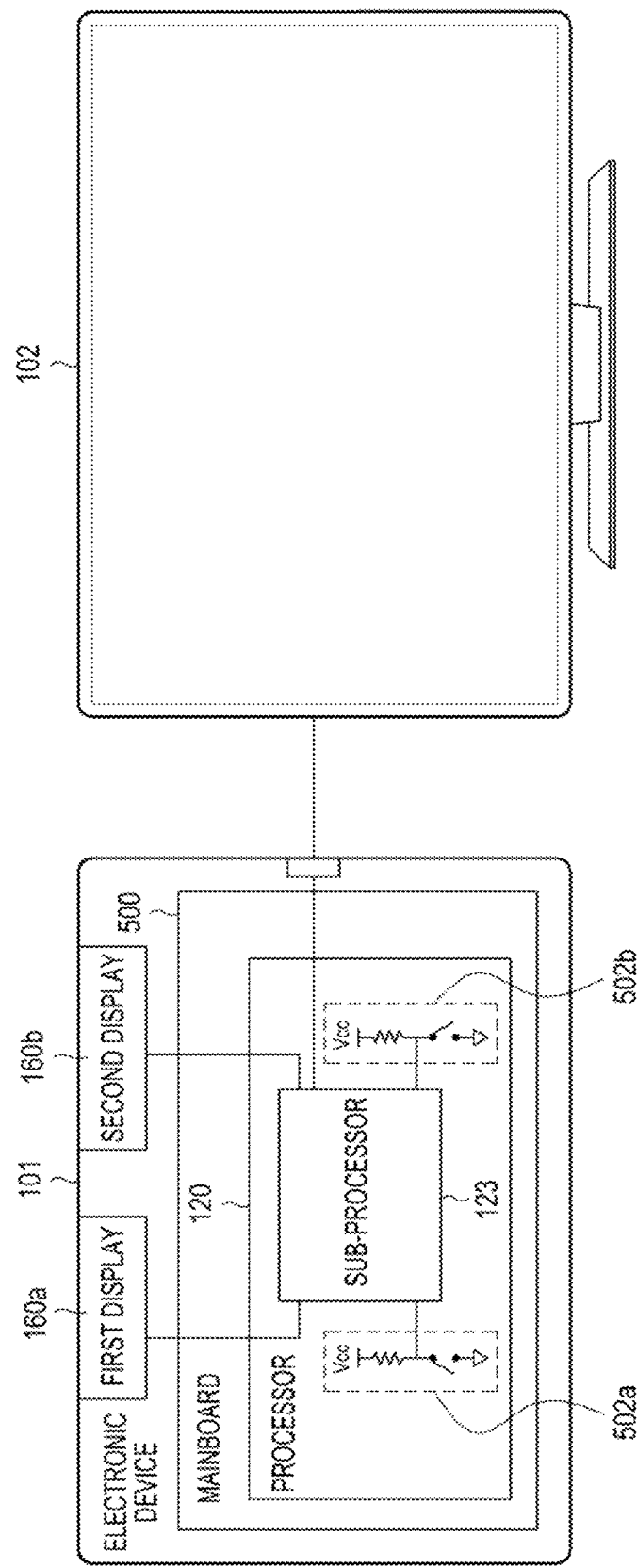
FIG. 4 is a diagram illustrating a function/functions or an operation/operations of identifying an internal display by an electronic device according to various embodiments.

FIG. 4 is a diagram illustrating a function/functions or an operation/operations of identifying (i.e., recognizing) an internal display by an electronic device according to various embodiments. Referring to FIG. 4, the processor 120 may be disposed in a main board 500 of the electronic device 101. The processor 120 may include the sub-processor 123 (e.g., a graphics processor). According to various embodiments, the graphics processor may be disposed outside the processor 120 (i.e., may be disposed separately from the processor 120 of FIG. 1).

The first display 160a and the second display 160b may be connected to the sub-processor 123 via a display interface (e.g., a digital display interface (DDI)). In the sub-processor 123, devices (e.g., pull-up resistors 502a and 502b) for determining whether the first display 160a and the second display 160b are connected may be provided. Each pull-up resistor 502a and 502b may be connected to the sub-processor 123 via a predetermined interface (e.g., GPIO_1 and GPIO_2) of the sub-processor 123. The processor 120 may determine whether the first display 160a and the second display 160b are connected based on the state of a voltage input to the sub-processor 123 and/or the processor 120 (i.e., which is determined by the sub-processor 123 and/or the processor 120) according to operation of the pull-up resistor 502a and 502b. For example, when all voltage states indicate "high", it is determined that the first display 160a and the second display 160b are connected. Conversely, when all voltage states indicate "low", it is determined that the first display 160a and the second display 160b are disconnected (i.e., not connected). However, the use of pull-up resistors 502a and 502b is merely an example. According to various embodiments, pull-down resistors (not illustrated) may be used as alternatives for or interchangeably with the pull-up resistors 502a and 502b. The electronic device 102 may be connected to the processor 120 via the connection terminal 178 installed in the electronic device 101, so as to be operable. The connection states of the internal displays 160a and 160b, which are determined based on the voltage levels, may be stored in a resister of the sub-processor 123 or the processor 120 and/or in the memory 130 of the electronic device 101.

According to various embodiments, in the memory 130 or a predetermined area of the register of the sub-processor 123 or the processor 120, a display definition area may be allocated for storing information associated with attributes of a display (e.g., a connection type of the display, a connection state of the display, or the like) connected to the electronic device 101. Data indicating various connection types may be stored in the display definition area (for example, an internal display type (e.g., when an external display is not connected to the electronic device 101) or an external display type (e.g., when an external display is connected to the electronic device 101)). According to various embodiments, bits (e.g., "00" in the case of an eDP scheme, "01" in the case of a DP scheme, "10" in the case of a DVI scheme, and "11" in the case of an HDMI scheme) indicating various connection types (e.g., an embedded display port (eDP) scheme, a display port (DP) scheme, a digital visual interface (DVI) scheme, a high-definition multimedia interface (HDMI) scheme, or the like), and a bit ("1" in the case of connection to the electronic device 101 or the processor 120 and "0" in the case of no connection) indicating a current connection state may be stored in the display definition area. The display definition area may include areas allocated based on the number of displays installed in the electronic device 101 (e.g., an interface area (DD1_1) corresponding to the first display 160a of FIG. 1, an interface area (DD1_2) corresponding to the second display 160b, or the like). The number of areas allocated based on the number of displays may be changed based on the number of displays installed in the electronic device 101.

According to various embodiments, at least one identifier indicating the connection states of the internal displays 160a and 160b may be stored in advance in the memory (e.g., the memory 130 of FIG. 1) of the electronic device 101. The processor 120 or the sub-processor 123 may determine the connection states of the internal displays 160a and 160b based on the at least one previously stored identifier. In this instance, a function/operation of determining whether the internal displays 160a and 160b are connected via the pull-up resistors (or the pull-down resistors) may be omitted.

According to various embodiments, in operation 310, the electronic device 101 (e.g., the processor 120 of FIG. 1) may detect the connection of a plurality of displays to the processor 120.

According to various embodiments, the electronic device 101 may detect whether the internal displays 160a and 160b are connected based on at least some of the various embodiments that have been described with reference to FIG. 4 and operation 300. Also, the electronic device 101 may detect the electronic device 102, which is connected to the processor 120 via the connection terminal 178 so as to be operable. Alternatively, the electronic device 101 may detect the electronic device 102 that is connected to the processor 120 via a short-range communication network such as Bluetooth, Wi-Fi direct, infrared data association (IrDA), or via a long-distance communication network such as a cellular network, the Internet, or a computer network (e.g., LAN or WAN), so as to be operable.

When it is detected that the electronic device 102 is connected to the electronic device 101 (e.g., the processor 120 of FIG. 1), the electronic device 101 may determine whether the electronic device 102 is a device with a display based on designated information. According to various embodiments, the designated information may be stored in advance in the electronic device 101 (e.g., the memory 130 of FIG. 1). According to various embodiments, the designated information may be provided from the electronic device 102 to the electronic device 101. According to various embodiments, when the electronic device 102 is connected to the electronic device 101, the designated information may be provided from a server that is connected to the electronic device 102 and/or the electronic device 101.

Based on at least some of the embodiments, which have been described with reference to operations 300 and 310, the electronic device 101 (e.g., the processor 120) may distinguish whether the plurality of displays are internal displays 160a and 160b or external displays.

According to various embodiments, in operation 320, when the external display is not connected, the electronic device 101 (e.g., the processor 120 of FIG. 1) may display a first screen according to a first mode (e.g., the first screen 200 of FIG. 2B) in a plurality of displays. According to various embodiments, the first mode may be the tablet mode. According to various embodiments, the electronic device 101 (e.g., the processor 120 or the sub-processor 123 of FIG. 1) may configure (i.e., implement) the same video BIOS (VBIOS) for the internal displays 160a and 160b, at the same time as or before operation 320. According to various embodiments, when it is detected that the electronic device 102 is connected to the electronic device 101, the electronic device 101 (e.g., the processor 120 or the sub-processor 123 of FIG. 1) may configure the same VBIOS for the internal displays 160a and 160b and the electronic device 102 at the same time as or before operation 330.

Figure 5A:
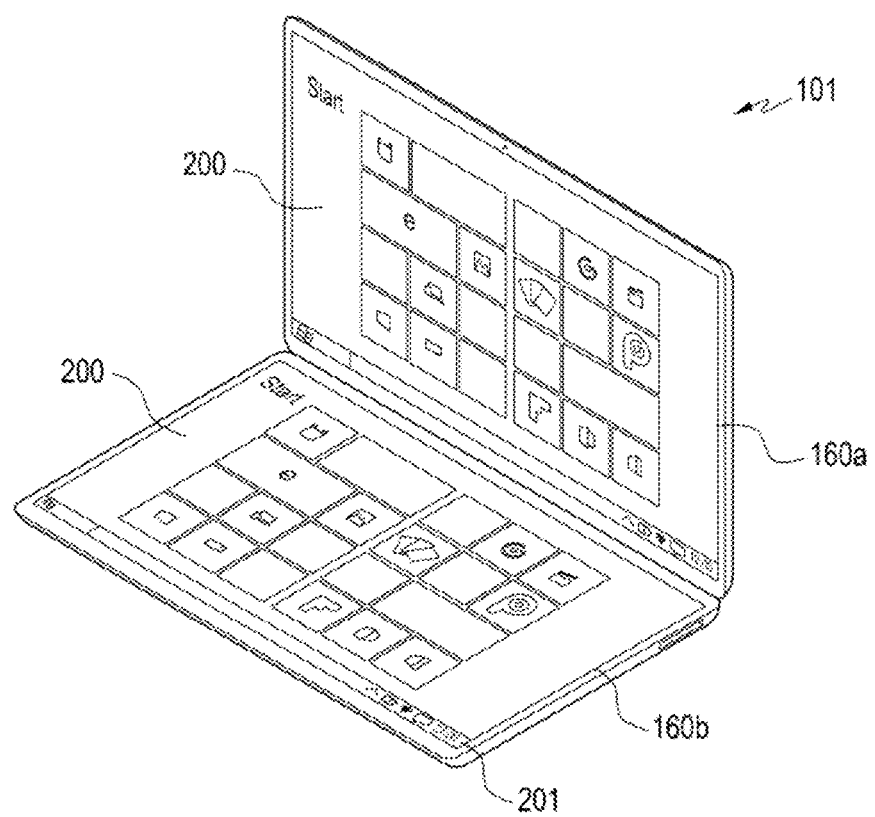
FIGS. 5A to 5C are diagrams illustrating various display schemes supported when an electronic device is in a tablet mode, according to various embodiments.
Figure 5B:
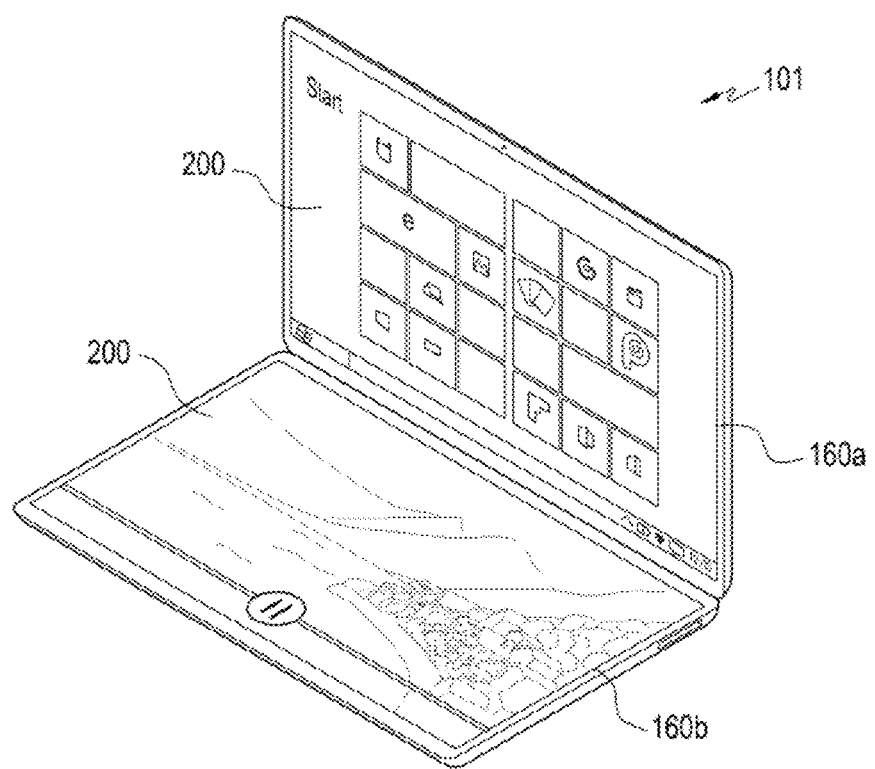
Figure 5C:
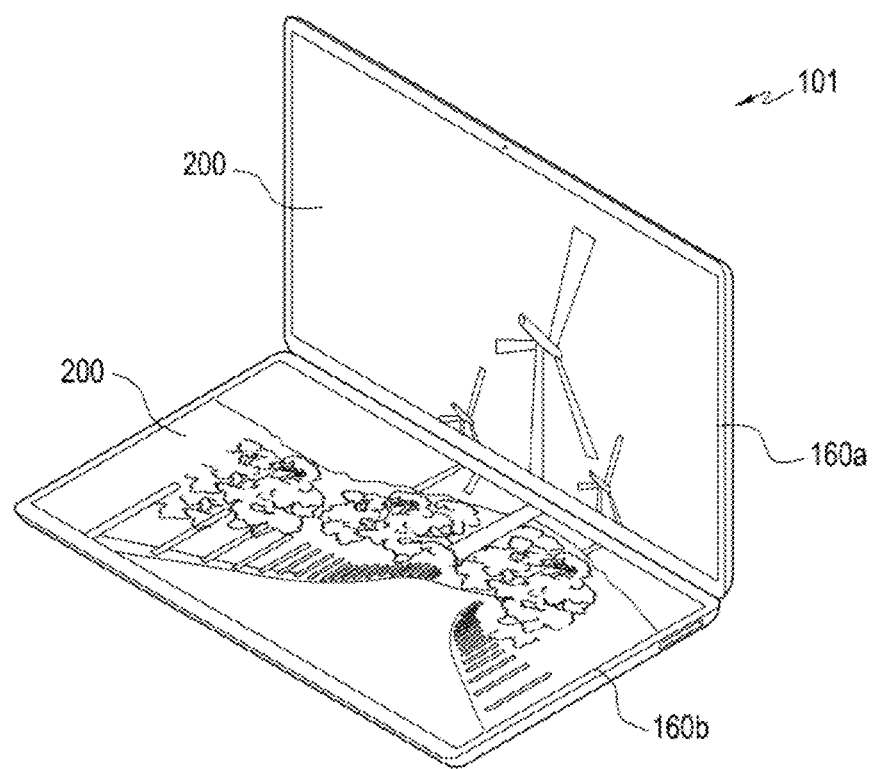

FIGS. 5A to 5C are diagrams illustrating various display examples supported when an electronic device is in a tablet mode according to various embodiments.

Referring to FIG. 5A, the tablet mode may include a duplication mode. As illustrated in FIG. 5A, in duplication mode, the same object may be displayed on all of the internal displays 160a and 160b. Alternatively, according to various embodiments, in duplication mode, to improve user's convenience from a visual perspective, a screen remaining after excluding some previously designated objects (e.g., a bar 201, a control menu 602 of FIG. 6B, or the like) from a screen displayed on the first display 160a may be displayed on the second display 160b.

According to various embodiments, when the electronic device 102 is connected to the electronic device 101, the same object may be displayed on the internal displays 160a and 160b and the electronic device 102 in duplication mode. In the present disclosure, the term "duplication mode" of the tablet mode may also be referred to as a normal tablet mode so as to distinguish the same from an extended tablet mode.

Referring to FIGS. 5B and 5C, the tablet mode may include an extended tablet mode. In extended tablet mode, as illustrated in FIG. 5B, the first screen 200 may be displayed as different screens (i.e., execution screens of different applications) on the internal displays 160a and 160b, respectively. Alternatively, in extended tablet mode, as illustrated in FIG. 5C, the first screen 200 may include a screen on which a part, and the remaining part of a single predetermined object, are visually and contiguously displayed on the internal displays 160a and 160b. For example, when a drag input for moving the predetermined object displayed in the first display 160a is received, the object may be moved from the first display 160a to the second display 160b according to the drag input. That is, in extended tablet mode, the electronic device 101 (e.g., the processor 120 of FIG. 1) may control internal displays 160a and 160b such that internal displays 160a and 160b respectively display visually contiguous screens or independent screens. According to various embodiments, when the electronic device 102 is connected to the electronic device 101, different objects are displayed, or the parts of a single predetermined object are visually and contiguously displayed on the internal displays 160a and 160b and the electronic device 102 in extended tablet mode.

According to various embodiments, in operation 330, when the external display is connected, the electronic device 101 (e.g., the processor 120 of FIG. 1) may display the second screen 210 according to a second mode in the plurality of displays. According to various embodiments, the second mode may indicate the desktop mode. According to various embodiments, when it is detected that the electronic device 102 is connected to the electronic device 101 (e.g., the processor 120 of FIG. 1), the electronic device 101 may display the second screen 210 in the plurality of displays, irrespective of the current mode of the electronic device 101. For example, when the first screen 200 is displayed on the internal displays 160a and 160b, the electronic device 101 may switch the first screen 200 to the second screen 210 and may display the second screen 210 on the internal displays 160a and 160b and the electronic device 102.

Hereinafter, various functions/operations related to mode switching will be described according to various embodiments.

FIGS. 6A to 6G are diagrams illustrating a function/functions or an operation/operations of switching to a tablet mode or an extended tablet mode from a desktop mode by an electronic device according to various embodiments.

Figure 6A:
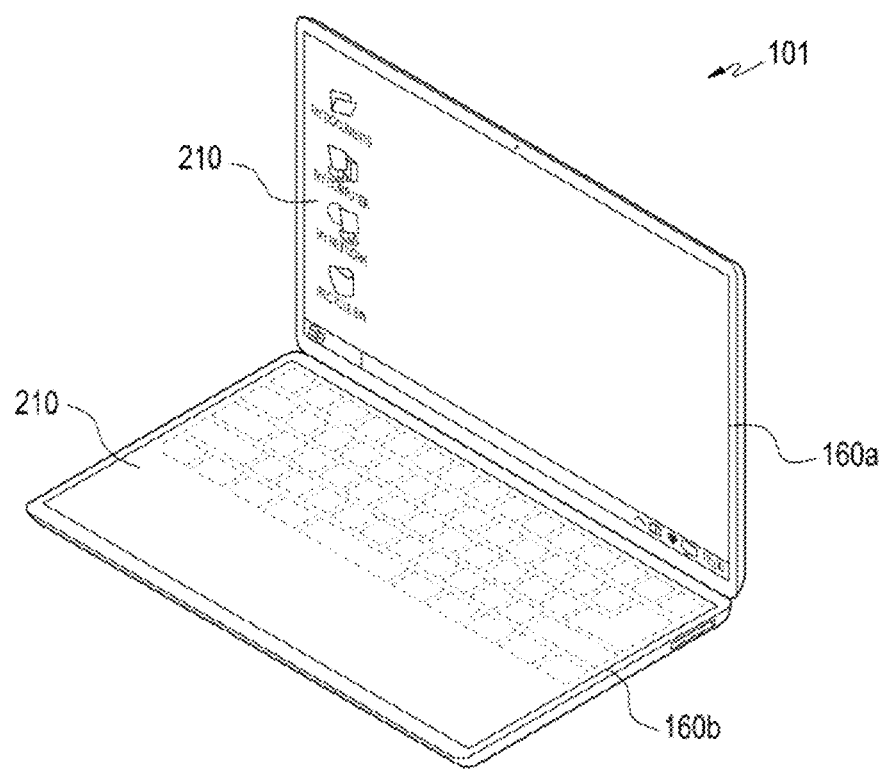
FIGS. 6A to 6G are diagrams illustrating a function/functions or an operation/operations of switching to a tablet mode or an extended tablet mode from a desktop mode by an electronic device according to various embodiments.

Referring to FIG. 6A, the electronic device 101 may display the second screen 210 on the internal displays 160a and 160b.

Figure 6B:
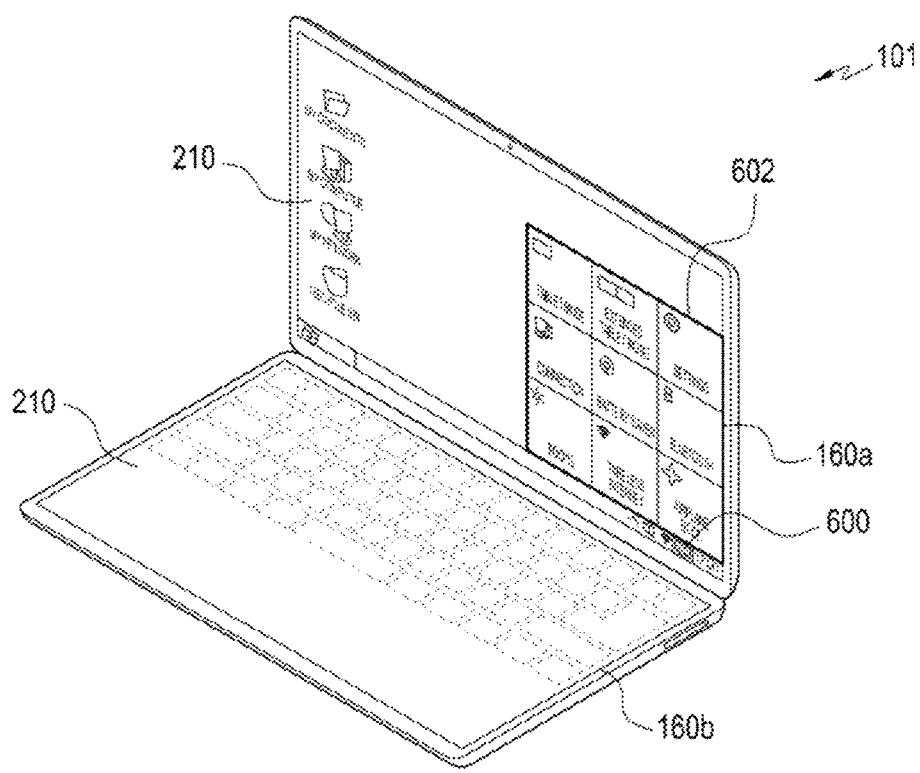
Figure 6C:
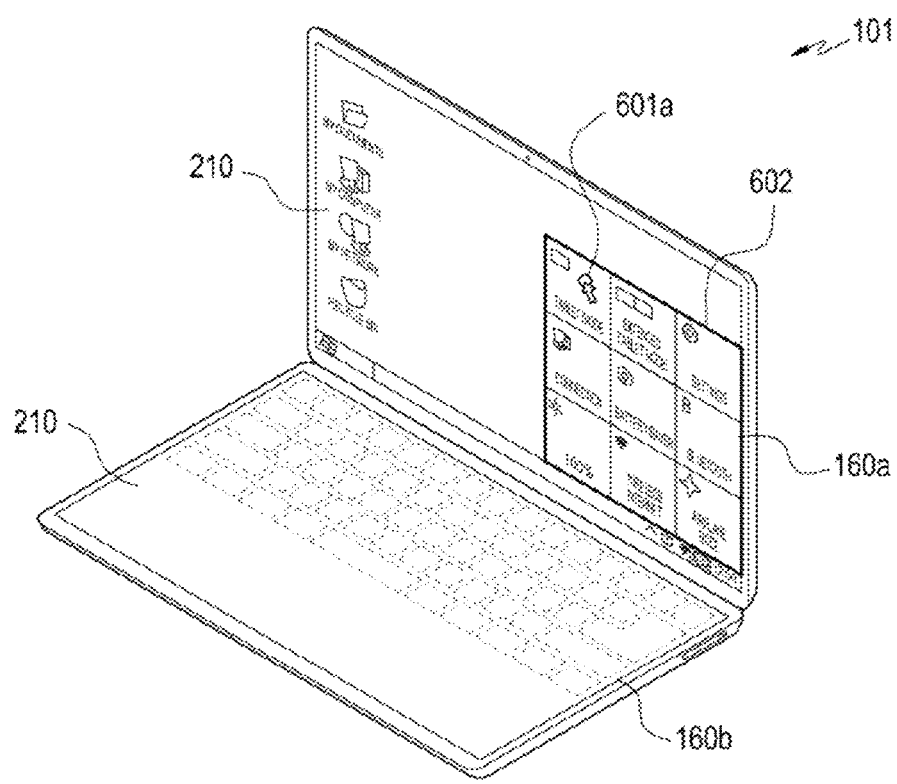

Referring to FIG. 6B, the electronic device 101 may receive input for displaying a control menu 602 while the second screen 210 is displayed on the internal displays 160a and 160b. The input for displaying the control menu 602 may include, for example, selection input for selecting a control menu execution icon 600 displayed on the second screen 210. FIG. 6B illustrates the state in which the control menu execution icon 600 is activated by the selection input and the control menu 602 is displayed on the first display 160a. The selection input for selecting the control menu execution icon 600 may be performed using any of various schemes, such as input via the mouse pointer, touch input, or input via the external input device. Referring to FIG. 6C, the electronic device 101 may display the control menu 602 on at least one of the internal displays 160a and 160b according to input for displaying the control menu 602. Referring to FIG. 6C, the electronic device 101 may receive a selection input 601a for entering the normal tablet mode. The selection input 601a for entering normal tablet mode may include, for example, selection input for selecting a "tablet mode" icon included in the control menu 602. According to various embodiments, the selection input 601a may be performed by a mouse pointer as illustrated in FIG. 6C. According to various embodiments, the selection input 601a may be performed using any of various schemes, such as touch input or input via the external input device. When the selection input 601a for entering normal tablet mode is received, the electronic device 101 may display the first screen 200 according to the normal tablet mode on the internal displays 160a and 160b.

Figure 6D:
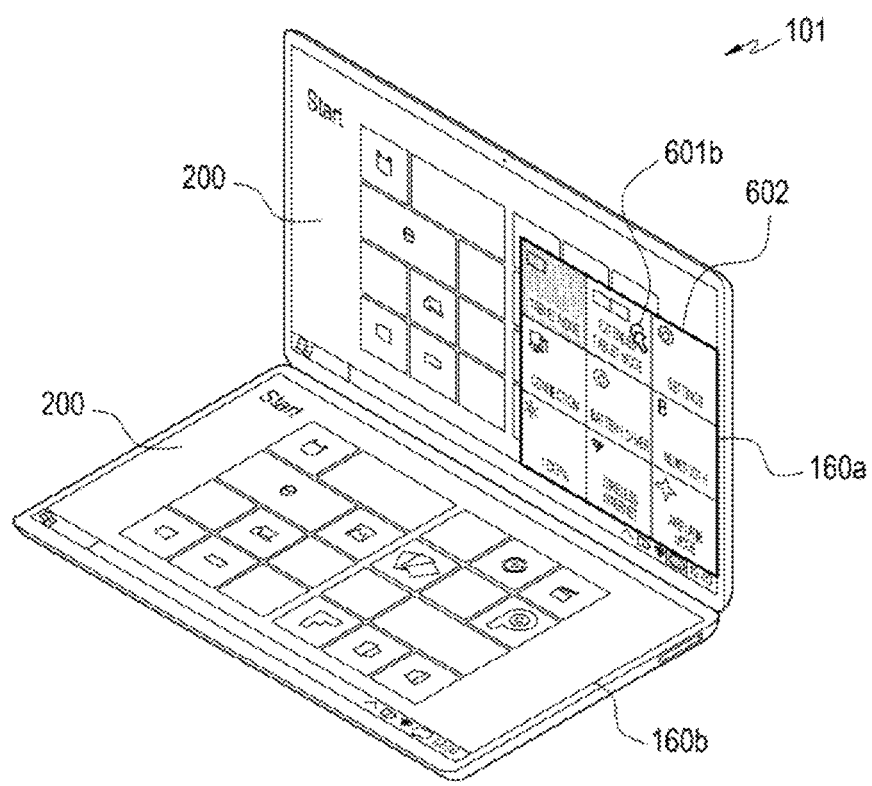

Referring to FIG. 6D, the electronic device 101 may receive selection input 601b for entering the extended tablet mode. The selection input 601b for entering the extended tablet mode may include, for example, selection input on an "extended tablet mode" icon included in the control menu 602. According to various embodiments, the selection inputs 601a and 601b may be performed by a mouse pointer, as illustrated in FIGS. 6C and 6D. According to various embodiments, the selection inputs 601a and 601b may be performed using any of various schemes, such as touch input or by performing an input via the external input device. When the selection input 601b for entering extended tablet mode is received, the electronic device 101 may display a screen according to the extended tablet mode on the internal displays 160a and 160b, as illustrated in FIG. 5B or FIG. 5C. Although FIG. 6D illustrates an embodiment in which the control menu 602 is not displayed on the second display 160b for improving user's convenience from a visual perspective, the embodiment is merely an example. According to various embodiments, the electronic device 101 (e.g., the processor 120 of FIG. 1) may perform control such that the control menu 602 is displayed on the second display 160b.

Figure 6E:
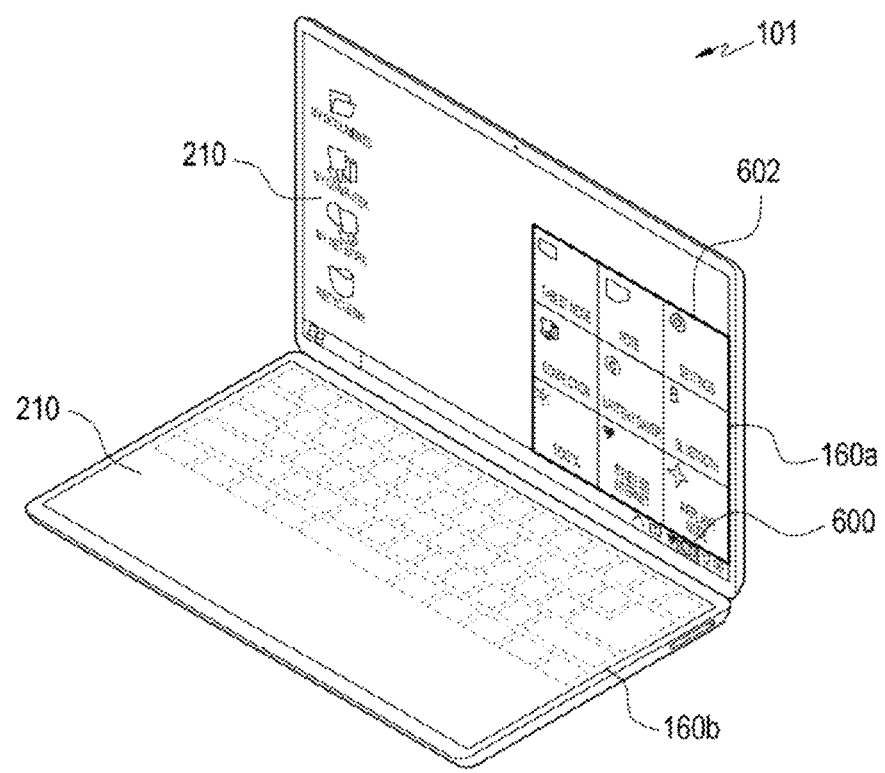
Figure 6F:
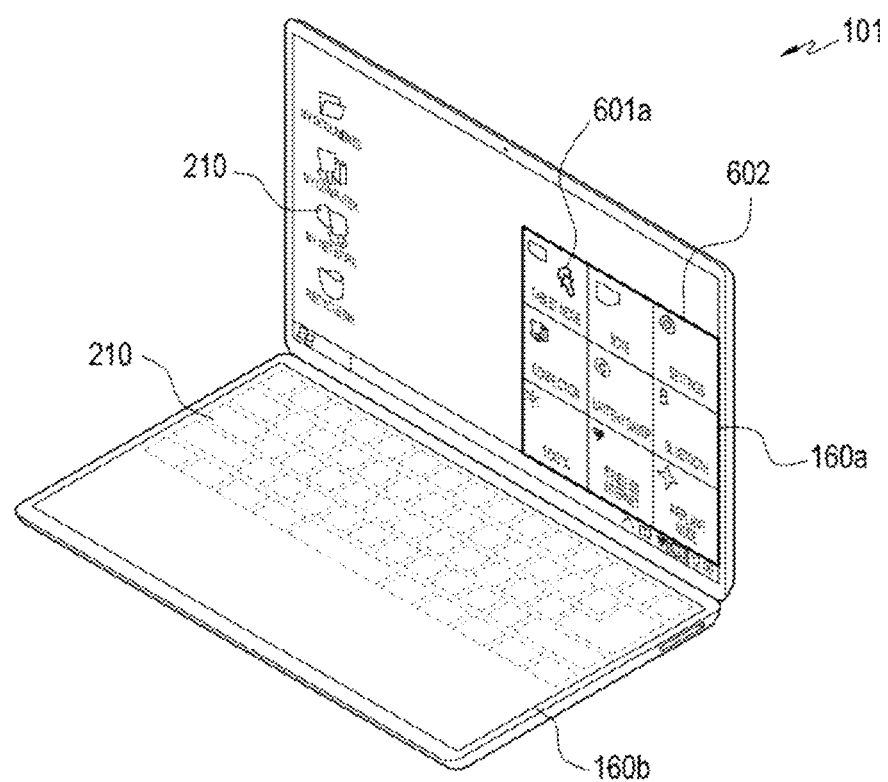
Figure 6G:
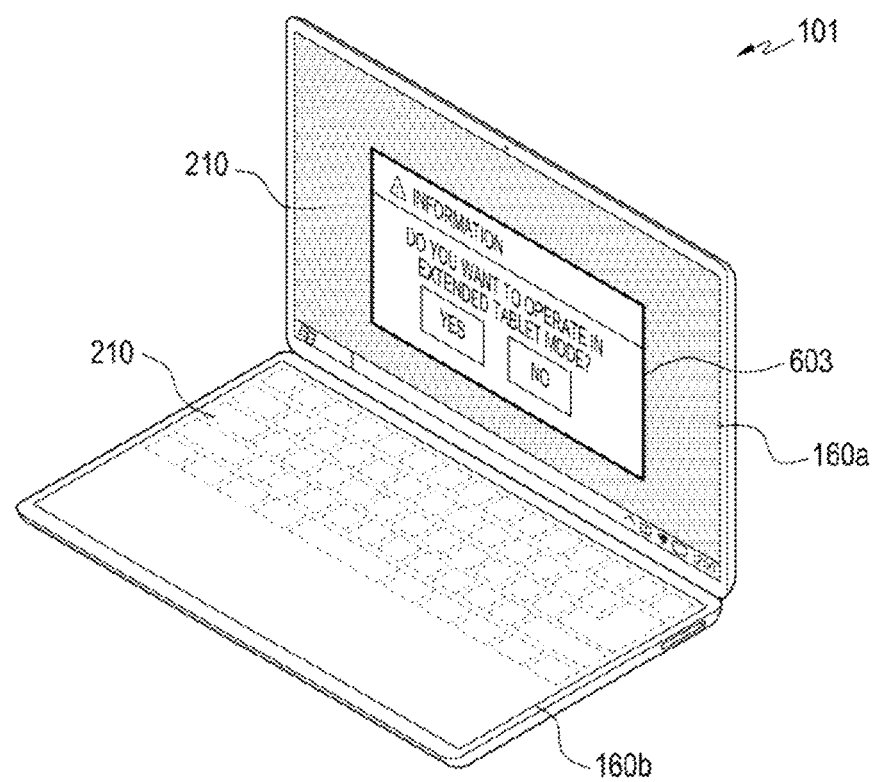

Referring to FIG. 6E, the electronic device 101 may display an icon (e.g., the "tablet mode" icon in FIG. 6E, which is referred to as an "integrated icon" for ease of description in the present document) that integrates an icon for executing normal tablet mode and an icon for executing extended tablet mode. As illustrated in FIG. 6F, the electronic device 101 may receive the selection input 601a for executing tablet mode. When the selection input 601a for executing tablet mode is received, the electronic device 101 may display a confirmation message 603 that confirms whether to execute extended tablet mode, as illustrated in FIG. 6G. According to selection input performed on the confirmation message 603, the electronic device 101 may display a screen according to normal tablet mode or a screen according to extended tablet mode on the internal displays 160a and 160b.

FIGS. 7A to 7I are diagrams illustrating a function/functions or an operation/operations of switching to a desktop mode from a tablet mode by an electronic device according to various embodiments.

Figure 7A:
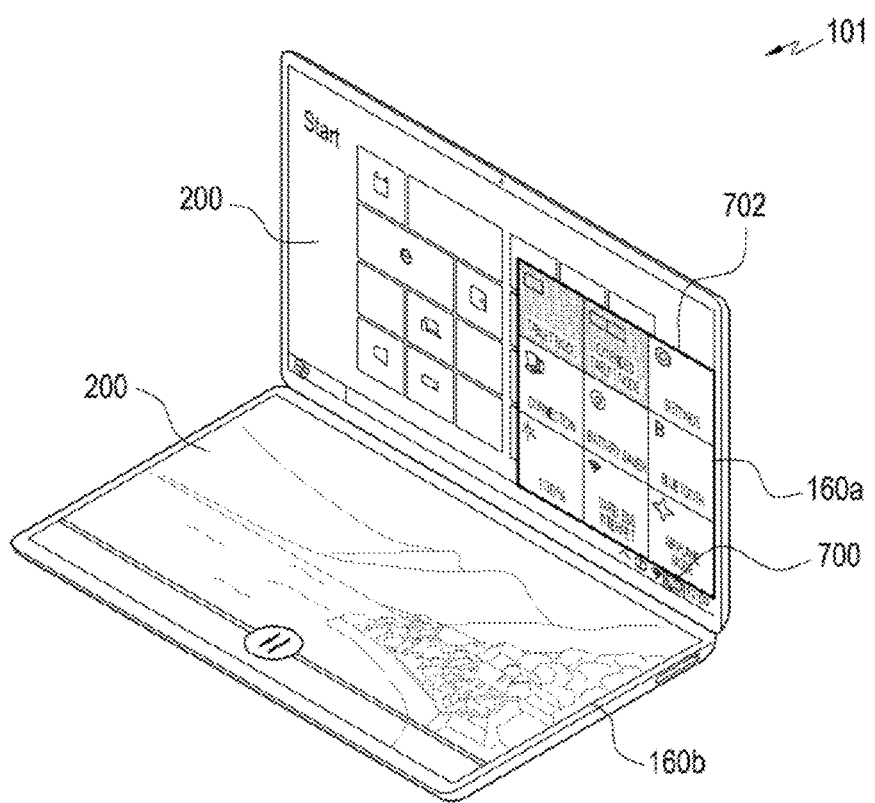
FIGS. 7A to 7I are diagrams illustrating a function/functions or an operation/operations of switching to a desktop mode from a tablet mode by an electronic device according to various embodiments.
Figure 7B:
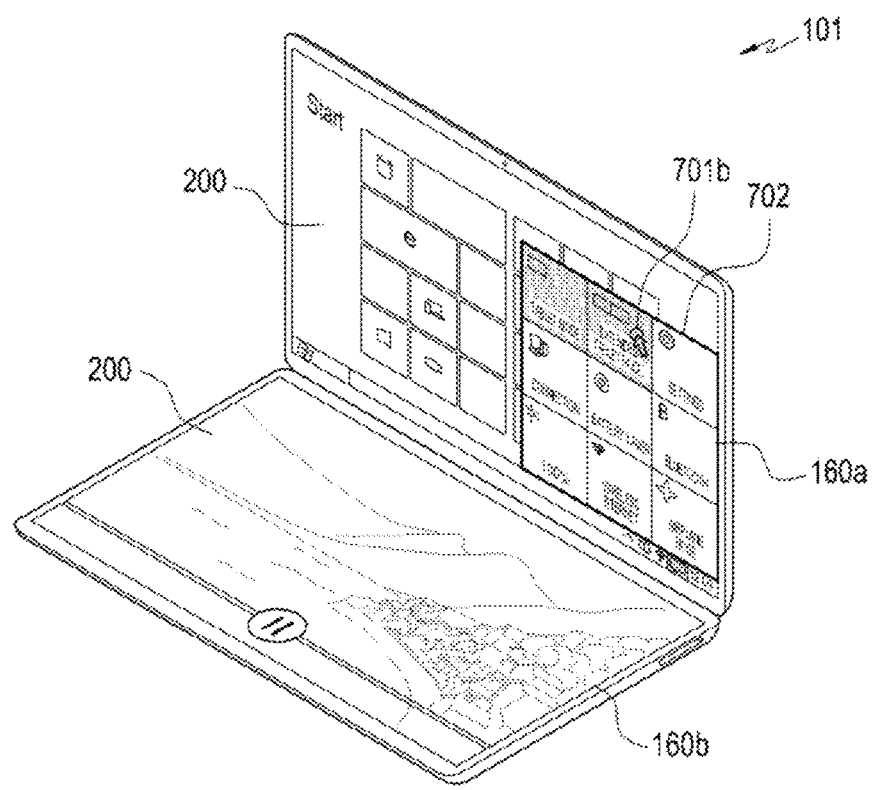
Figure 7C:
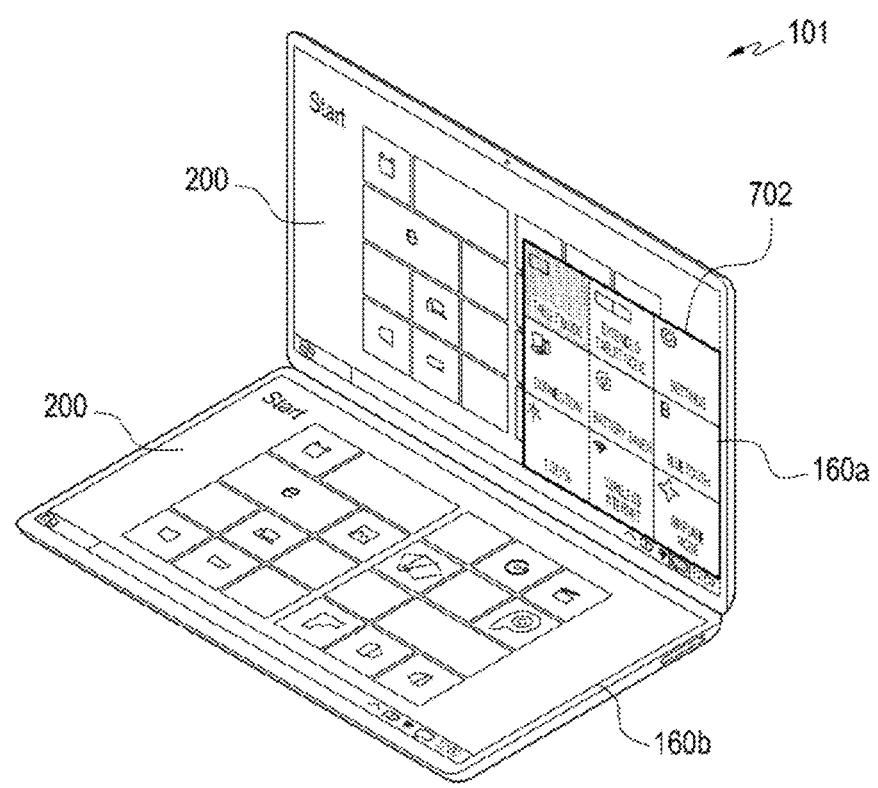

Referring to FIG. 7A, the electronic device 101 may receive a selection input for executing a control menu 702. The input for executing the control menu 702 may include a selection input on a control menu execution icon 700. When the selection input for executing the control menu 702 is received, the electronic device 101 may display the control menu 702 on at least one of the internal displays 160a and 160b. Referring to FIG. 7B, the electronic device 101 may receive a selection input 701b for canceling extended tablet mode. Referring to FIG. 7C, according to the selection input 701b for canceling extended tablet mode, the electronic device 101 may switch to normal tablet mode and may display a screen according to normal tablet mode. FIG. 7C illustrates an embodiment in which the control menu 702 is not displayed in the second display 160b, however, the embodiment is merely an example.

Figure 7D:
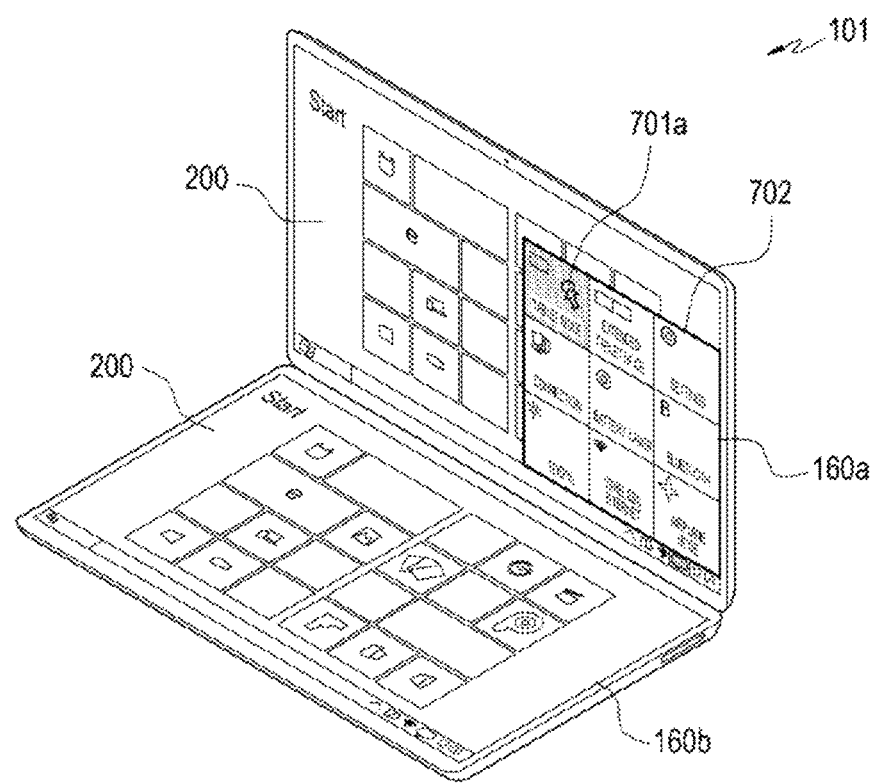
Figure 7E:
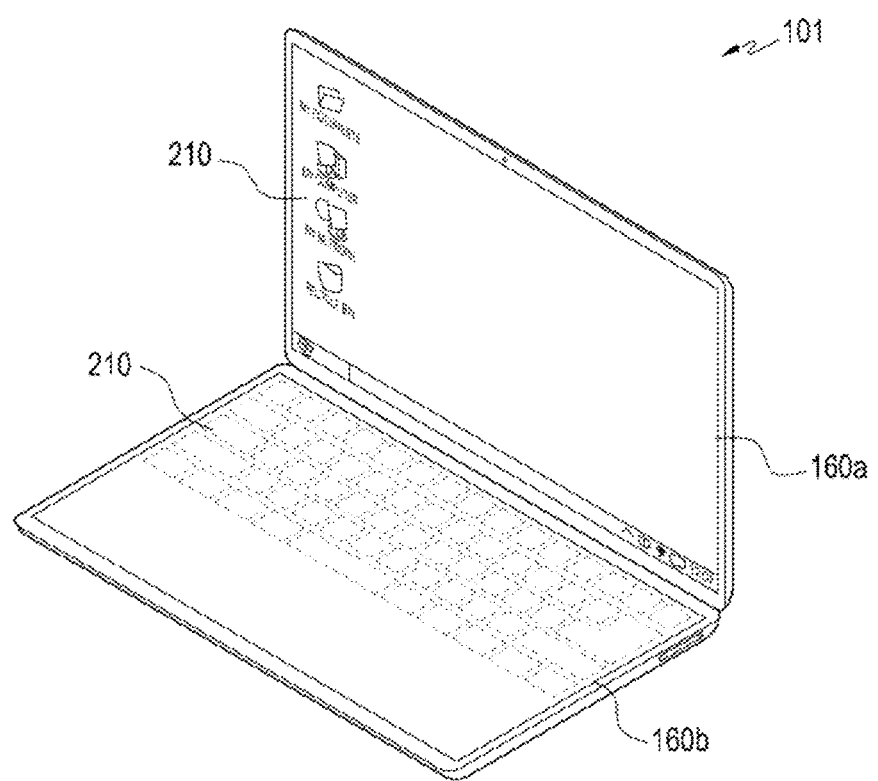

Referring to FIG. 7D, the electronic device 101 may receive the selection input 701a for canceling normal tablet mode. Referring to FIG. 7E, according to the selection input 701a for canceling normal tablet mode, the electronic device 101 may switch to the desktop mode and may display the screen 210 according to the desktop mode.

Figure 7F:
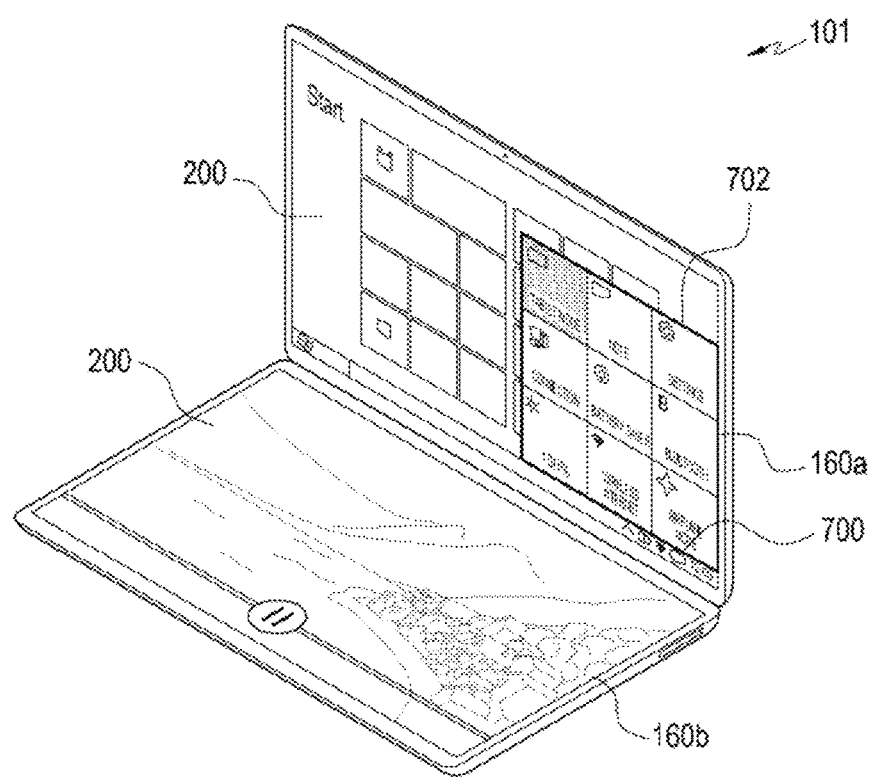
Figure 7G:
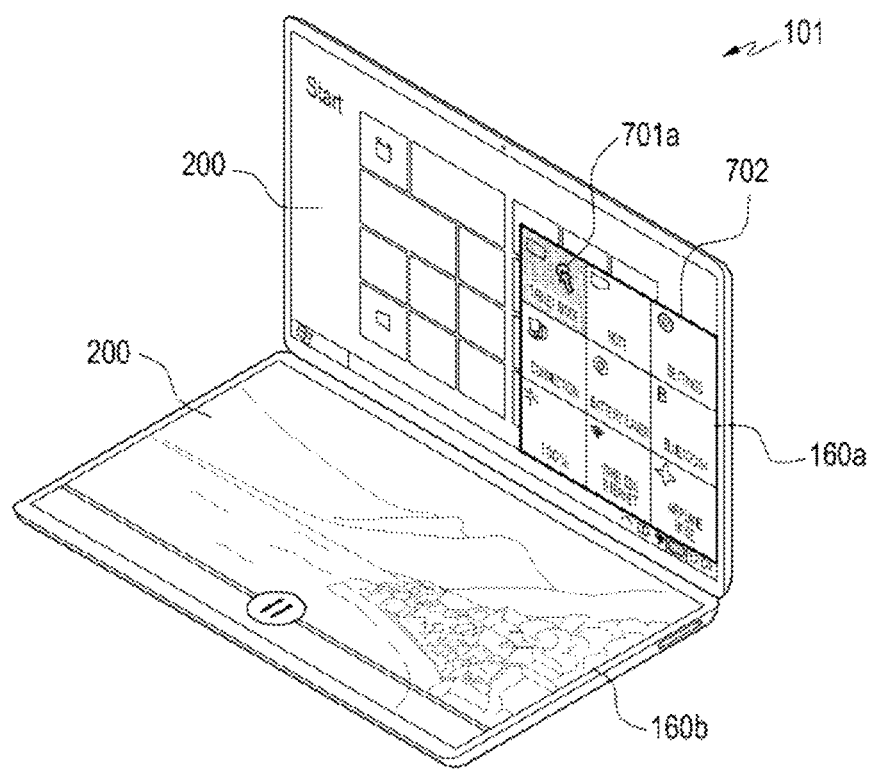
Figure 7H:
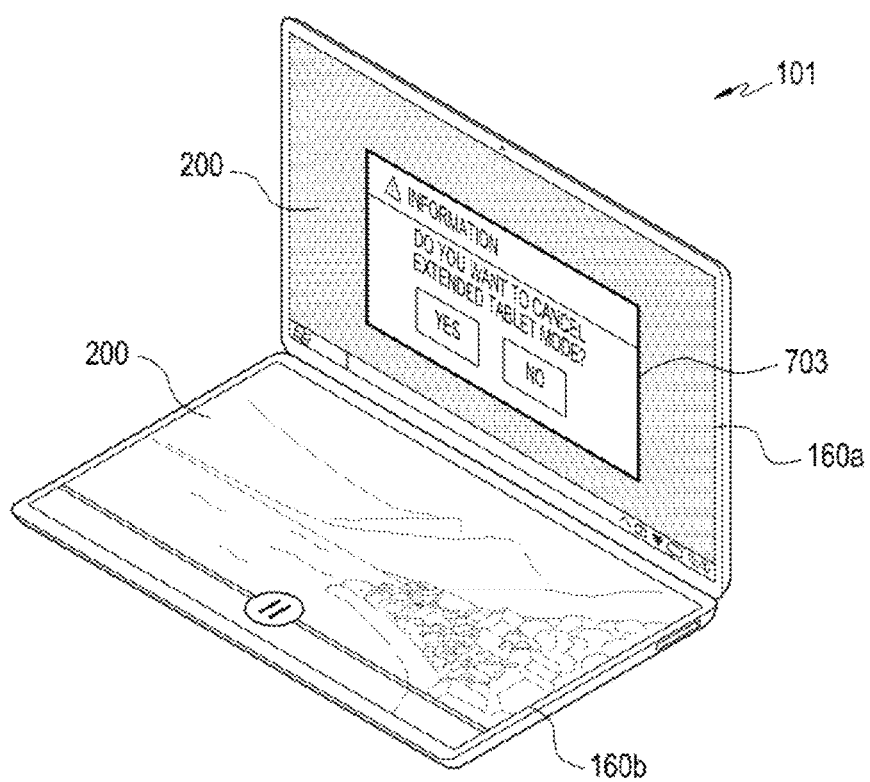
Figure 7I:
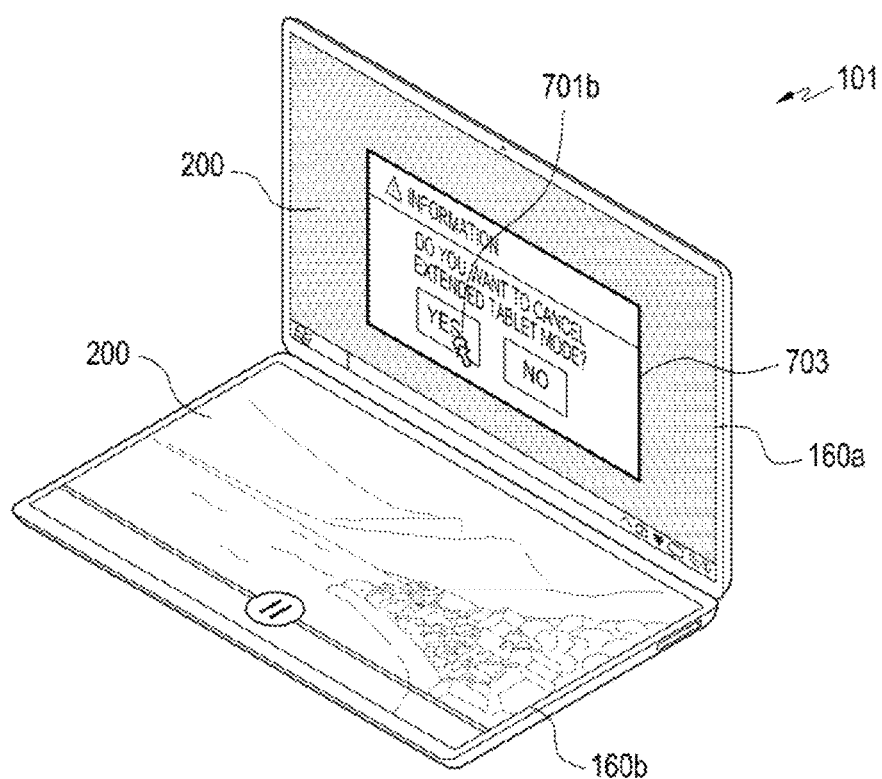

Referring to FIGS. 7F and 7G, when the control menu 702 includes the integrated icon, the electronic device 101 may receive the selection input 701a for canceling extended tablet mode and/or normal tablet mode. Referring to FIG. 7H, when the selection input 701a on the integrated icon is received, the electronic device 101 may display a confirmation message 703 for confirming whether to cancel extended tablet mode. Referring to FIG. 7I, the electronic device 101 may receive the selection input 701b for canceling the extended tablet mode. As illustrated in FIG. 7I, when the electronic device 101 receives the selection input 701b for canceling extended tablet mode, the electronic device 101 may switch to normal tablet mode. Alternatively, according to various embodiments, when the selection input 701b for canceling extended tablet mode is received, the electronic device may switch to the desktop mode, instead of switching to the normal tablet mode.

Figure 8A:
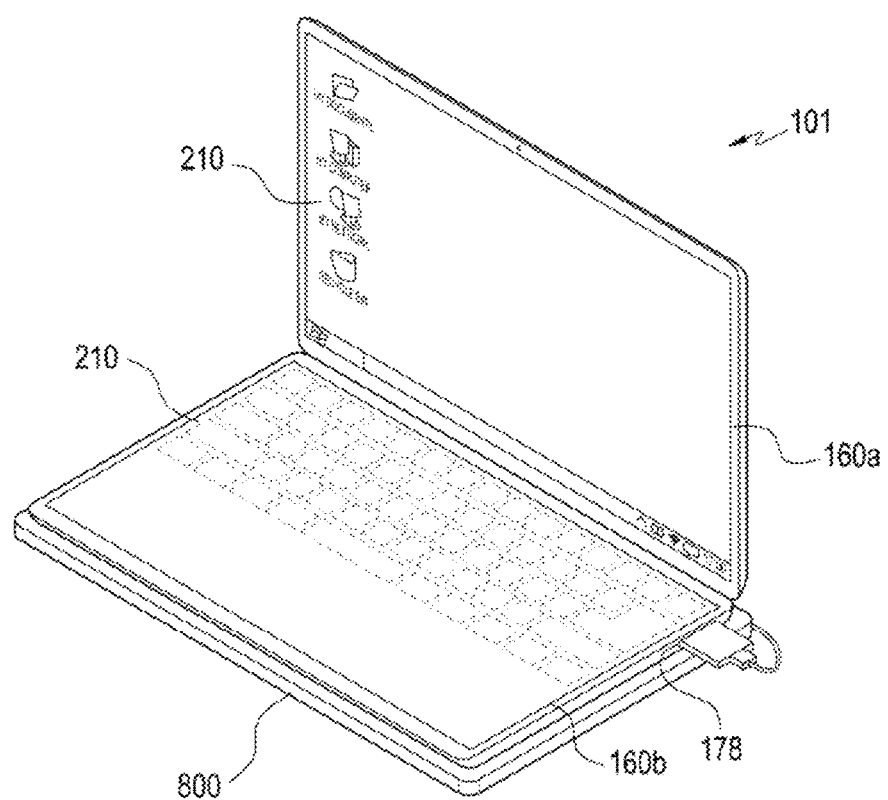
FIGS. 8A and 8B are diagrams illustrating a function/functions or an operation/operations of switching to a desktop mode from a tablet mode when an electronic device is connected to a sub-electronic device according to various embodiments.
Figure 8B:
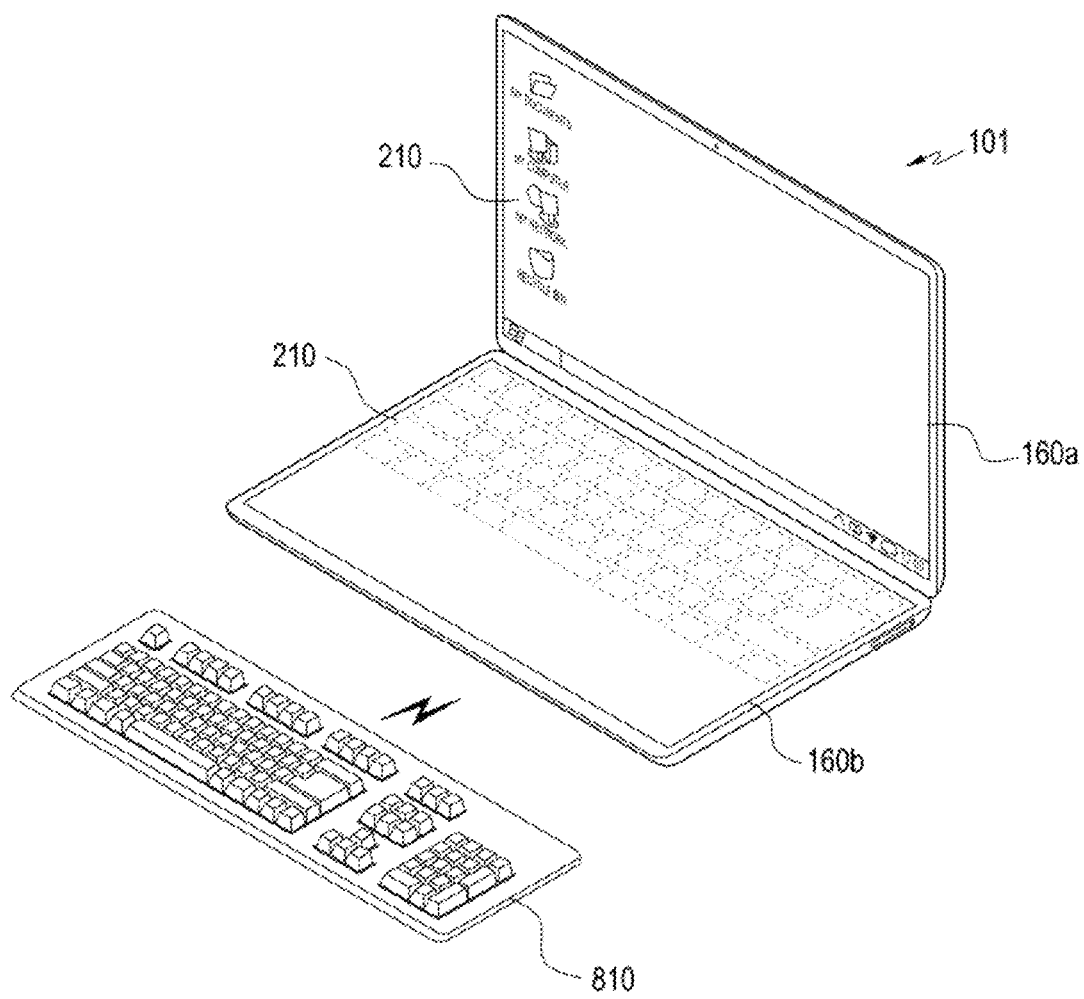

FIGS. 8A and 8B are diagrams illustrating a function/functions or an operation/operations of switching to a desktop mode from a tablet mode when an electronic device is connected to a sub-electronic device according to various embodiments.

Referring to FIG. 8A, the electronic device 101, according to various embodiments, may be connected to a support device 800 that is connected to the electronic device 101 via wired communication or wireless communication, thereby being supported. When it is detected that the electronic device 101 is connected to a sub-electronic device, such as the support device 800, the electronic device 101 may switch to desktop mode and may display the second screen 210 in the case in which the first screen 200 is displayed on the electronic device 101.

Referring to FIG. 8B, a Bluetooth keyboard 810 is illustrated as an embodiment of the sub-electronic device. When the Bluetooth keyboard 810 is connected to the electronic device 101 via wireless communication, the electronic device 101 may switch to desktop mode and may display the second screen 210 in the case in which the first screen 200 is displayed on the electronic device 101.

According to various embodiments, the electronic device 101 may receive information associated with the sub-electronic device connected to the electronic device 101 from the sub-electronic device (e.g., the sub-electronic device 800 or 810). The electronic device 101 (e.g., the processor 120 of FIG. 1) may determine whether a device connected to the electronic device 101 is an external electronic device with a display (e.g., the electronic device 102 of FIG. 1), or a sub-electronic device related to the electronic device 101, based on the received information. The information associated with the sub-electronic device may be stored in advance in the electronic device 101 (e.g., the memory 130 of FIG. 1). Alternatively, the information associated with the sub-electronic device may be provided from a server connected to the sub-electronic device and/or the electronic device 101, when the sub-electronic device is connected to the electronic device 101. Alternatively, the information associated with the sub-electronic device may be provided from the sub-electronic device to the electronic device 101.

According to various embodiments, the sub-electronic device may include various electronic devices, such as a wired keyboard, a cradle, a docking station, a cover that is connected to the electronic device 101 via wired communication or wireless communication, or the like. The term "sub-electronic device" mentioned in the present disclosure may indicate an electronic device that does not have a display in at least some embodiments.

Figure 9A:
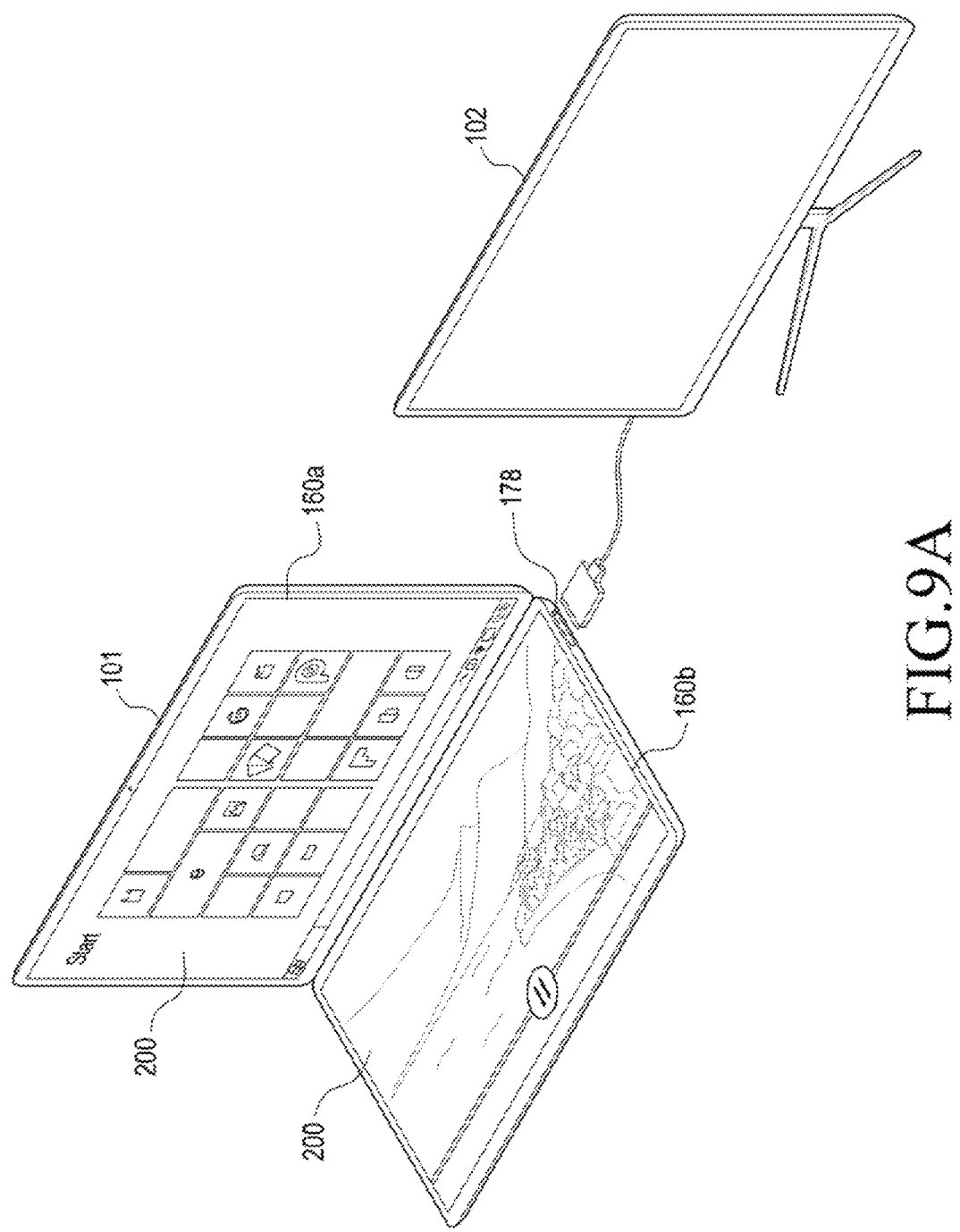
FIGS. 9A to 9C are diagrams illustrating a function/functions or an operation/operations of switching to a desktop mode from a tablet mode when an external electronic device is connected to an electronic device, according to various embodiments.
Figure 9B:
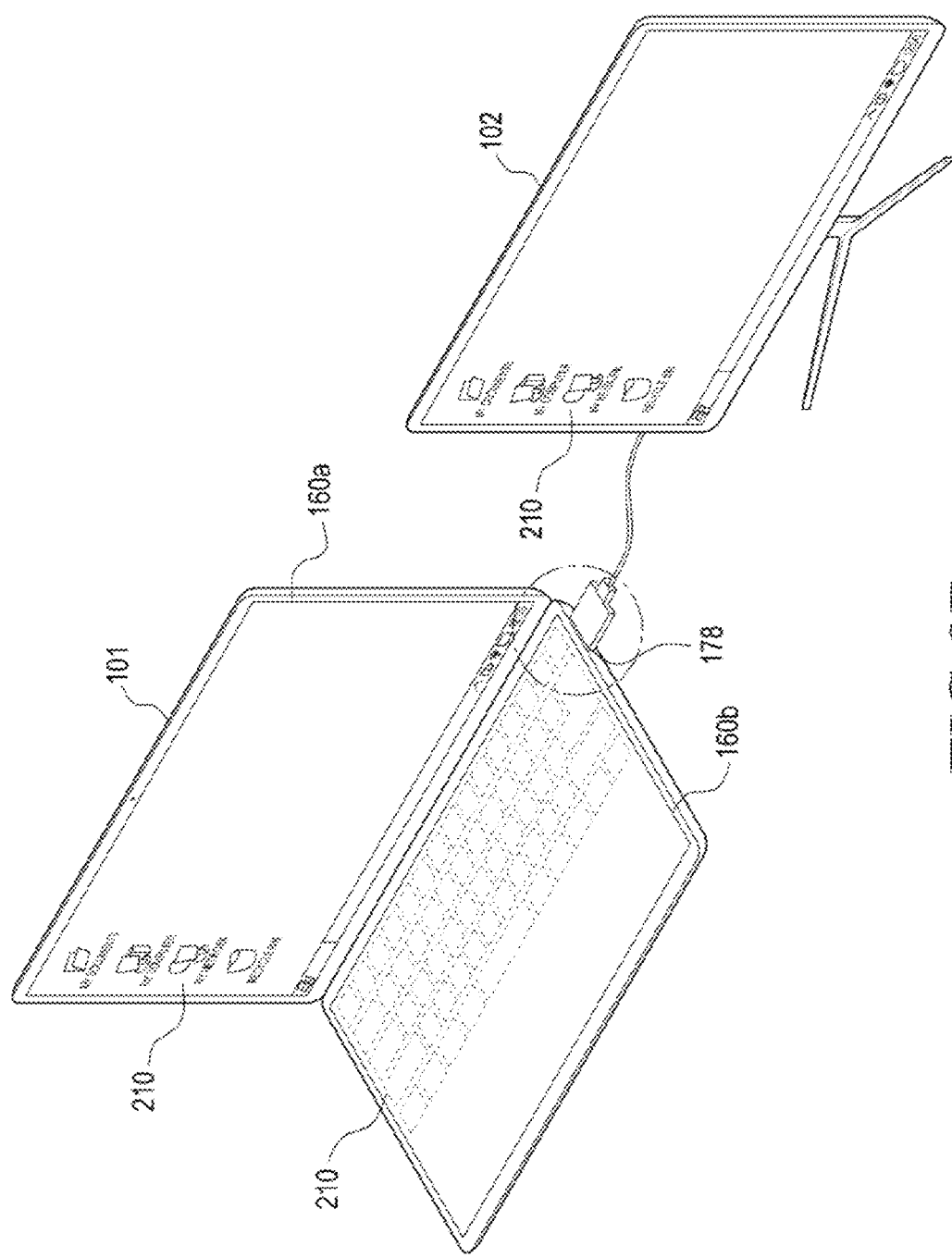
Figure 9C:
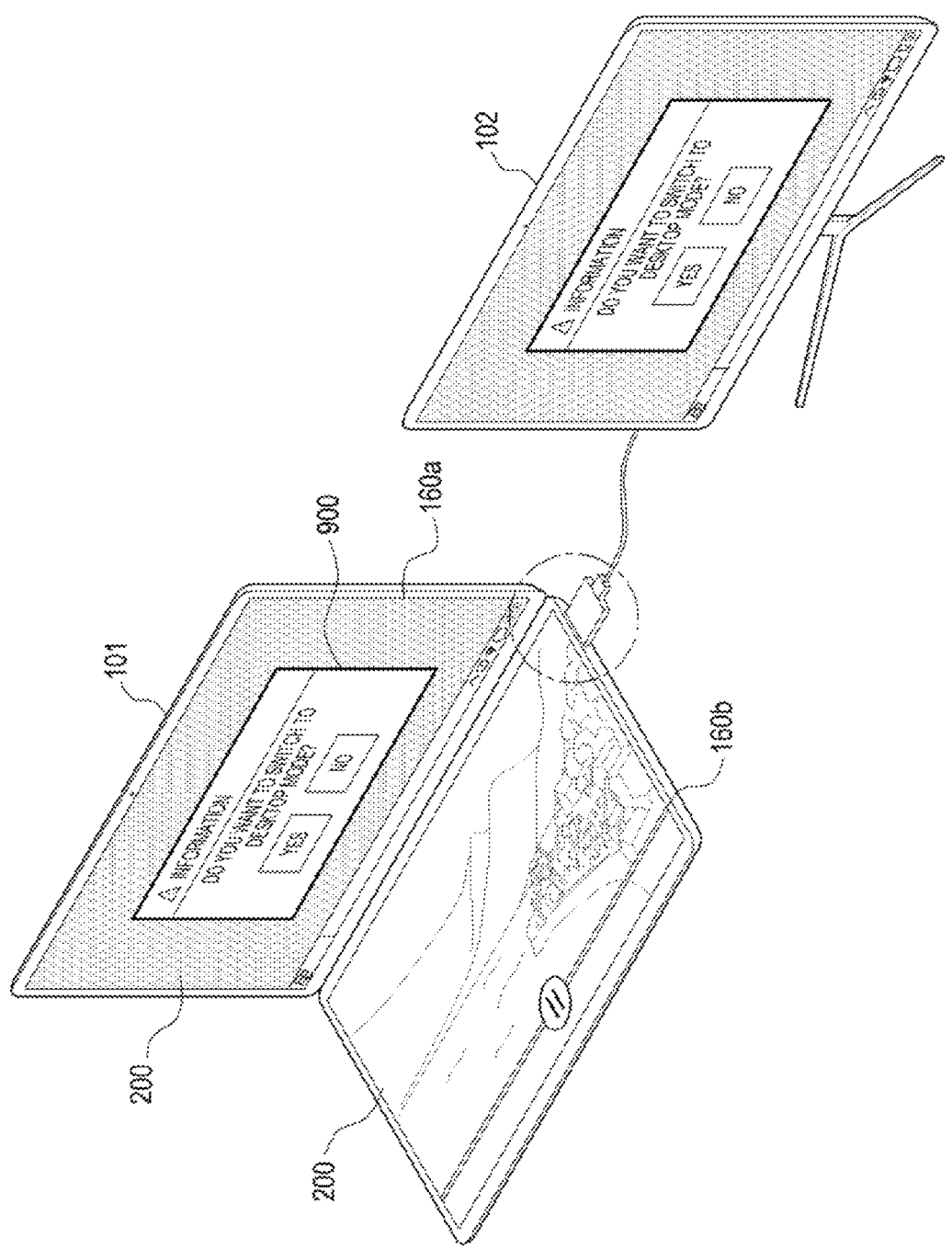

FIGS. 9A to 9C are diagrams illustrating a function/functions or an operation/operations of switching to a desktop mode from a tablet mode when an external electronic device is connected to an electronic device according to various embodiments.

Referring to FIG. 9A, the electronic device 102 may be connected to the electronic device 101 via the connection terminal 178. Referring to FIG. 9B, when it is detected that the electronic device 102 is connected, the electronic device 101 (e.g., the processor 120 of FIG. 1) may switch to desktop mode from tablet mode and may display the second screen 210. Referring to FIG. 9C, when it is detected that the electronic device 102 is connected, the electronic device 101 may display a confirmation message 900 associated with whether to switch to desktop mode from tablet mode on at least one of the internal displays 160a and 160b. When selection input on the confirmation message 900 is received, the electronic device 101 may perform a function/operation according to the selection input.

Figure 10A:
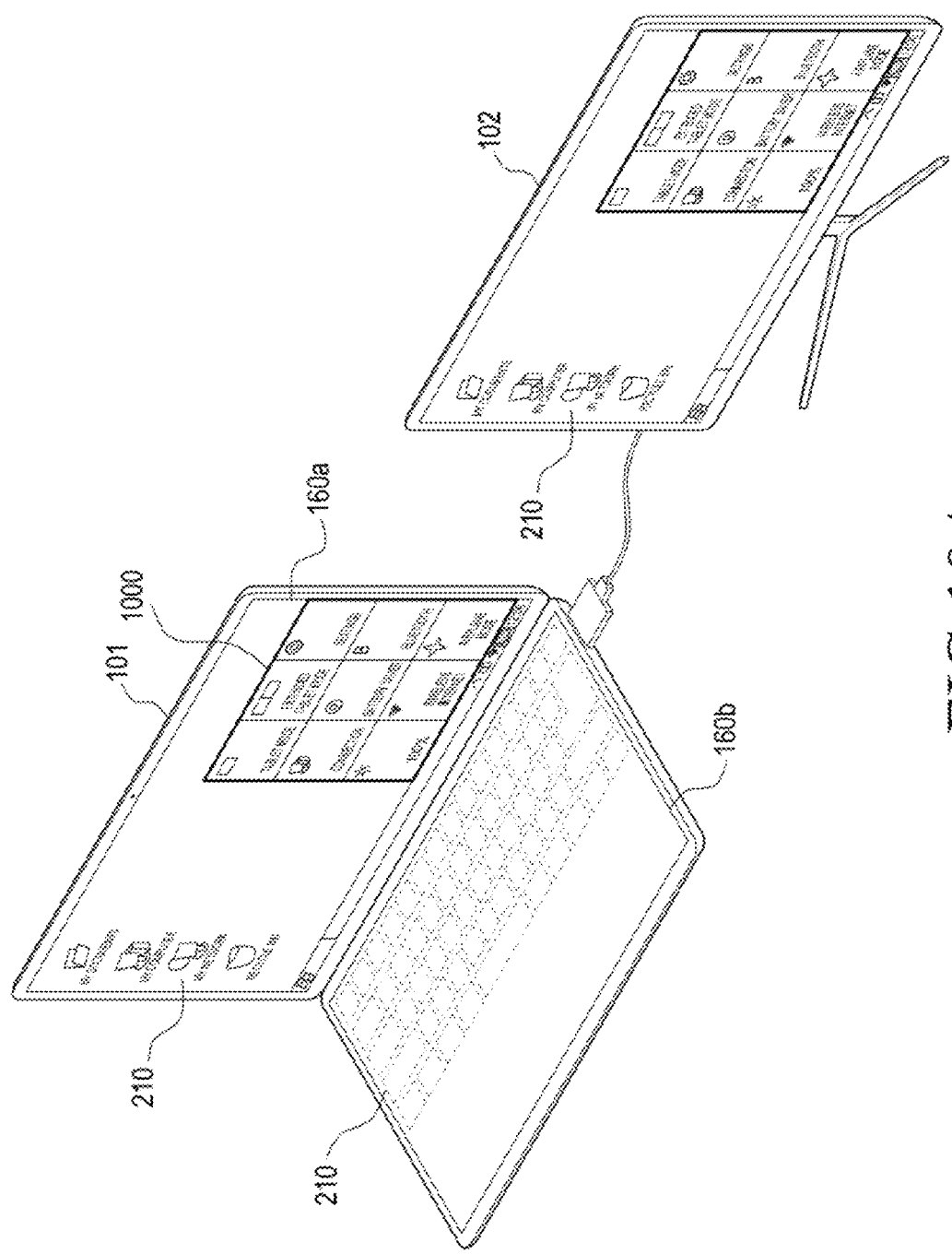
FIGS. 10A to 10E are diagrams illustrating a function/functions or an operation/operations of switching to a tablet mode from a desktop mode when an external display is connected to an electronic device, according to various embodiments.
Figure 10B:
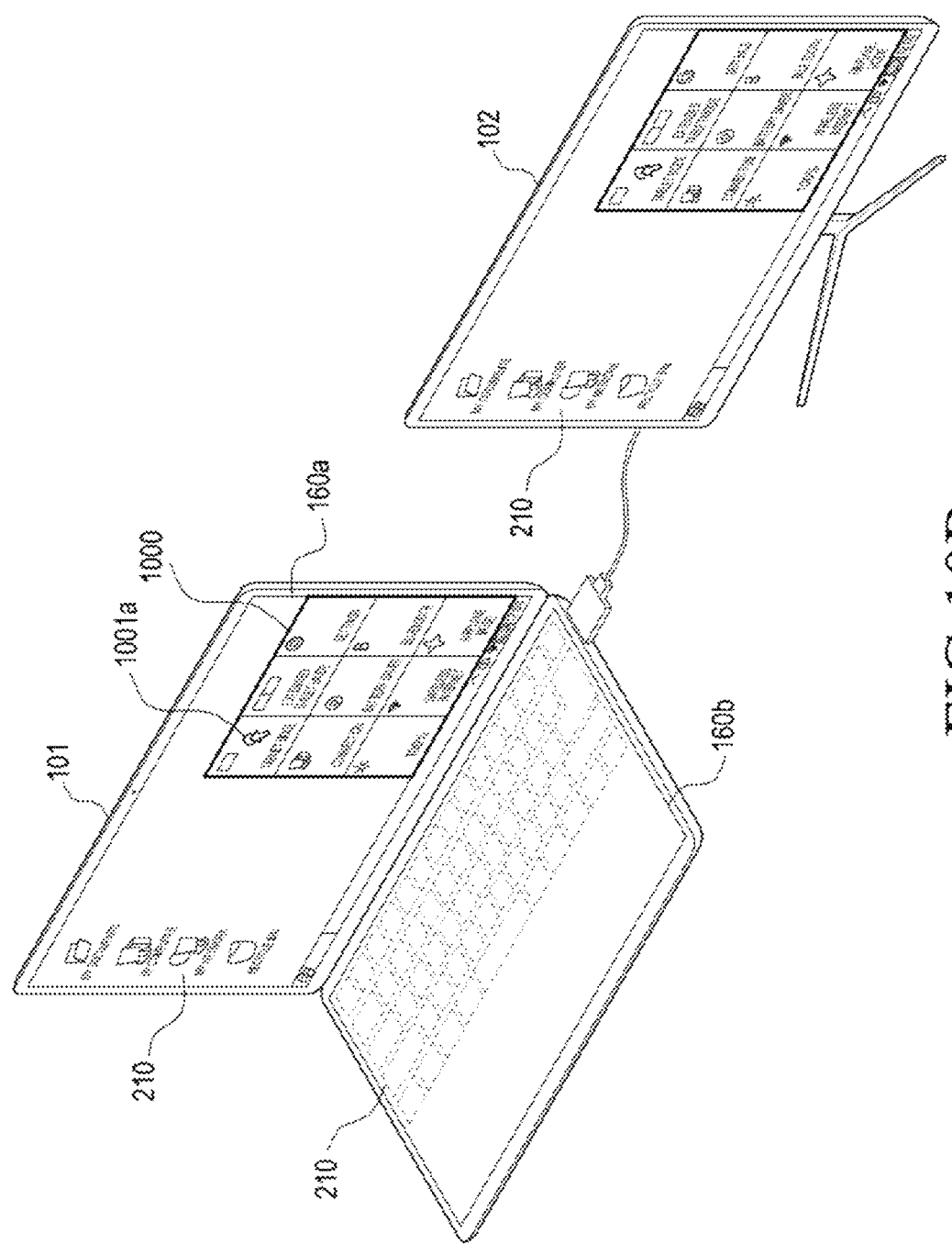
Figure 10C:
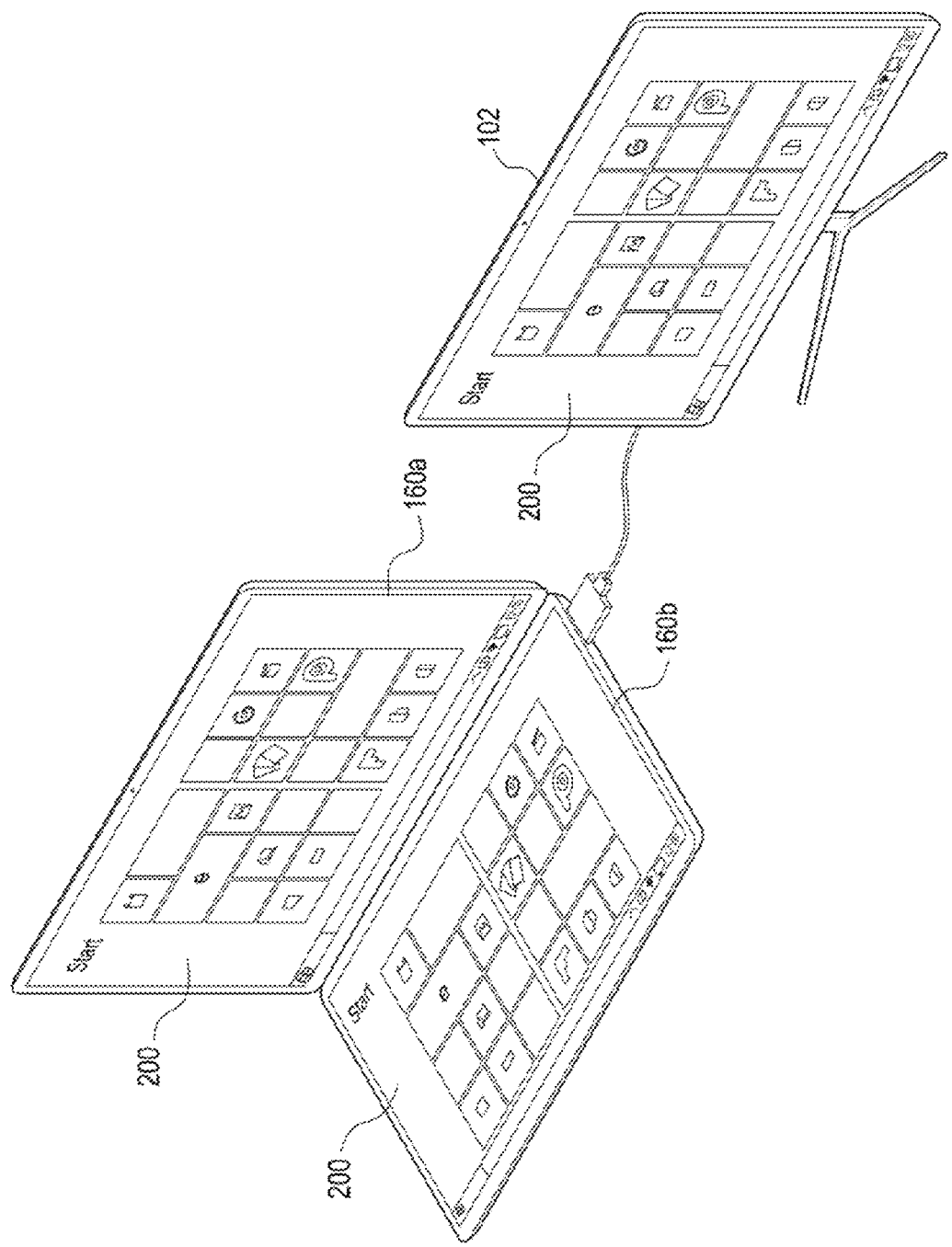

FIGS. 10A to 10C are diagrams illustrating a function/functions or an operation/operations of switching to a tablet mode from a desktop mode when an external electronic device is connected to an electronic device according to various embodiments.

Referring to FIG. 10A, the electronic device 101 may display the second screen 210 on the internal displays 160a and 160b. The electronic device 101 may display a control menu 1000 on at least one (e.g., the first display 160a of FIG. 1) of the internal displays 160a and 160b in response to a selection input on a control menu execution icon. The electronic device 101 (e.g., the processor 120 of FIG. 1) may display, on the electronic device 102, a screen corresponding to the screen currently being displayed in the first display 160a.

Referring to FIG. 10B, the electronic device 101 may receive a selection input 1001a for entering the normal tablet mode. Although FIGS. 10A and 10B illustrate an embodiment in which the control menu 1000 is displayed by the electronic device 102 in normal tablet mode the embodiment is merely an example. According to various embodiments, in order to improve user's convenience from a visual perspective, the electronic device 101 (e.g., the processor 120 of FIG. 1) may control the control menu 1000 to be displayed by the electronic device 102.

Figure 10D:
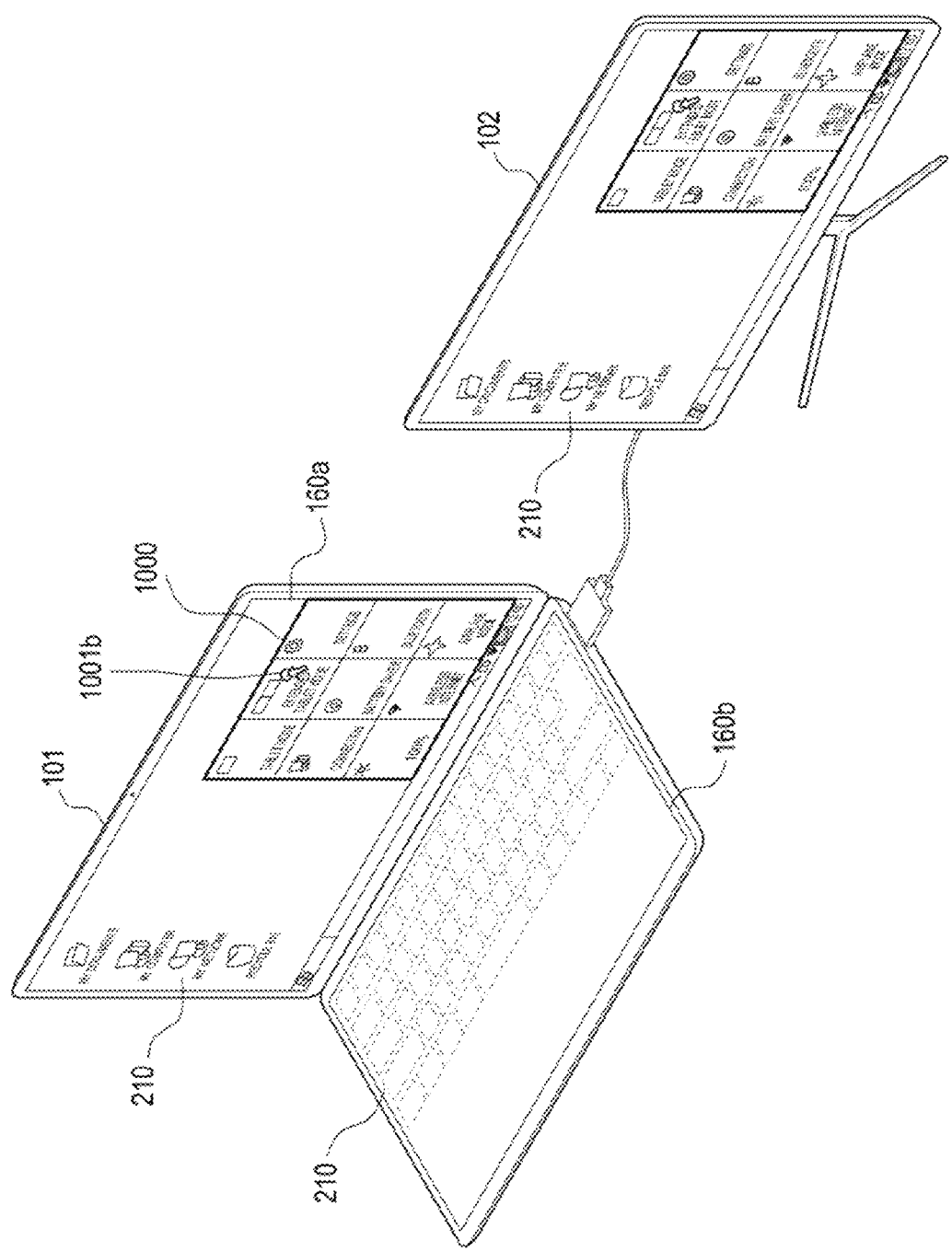
Figure 10E:
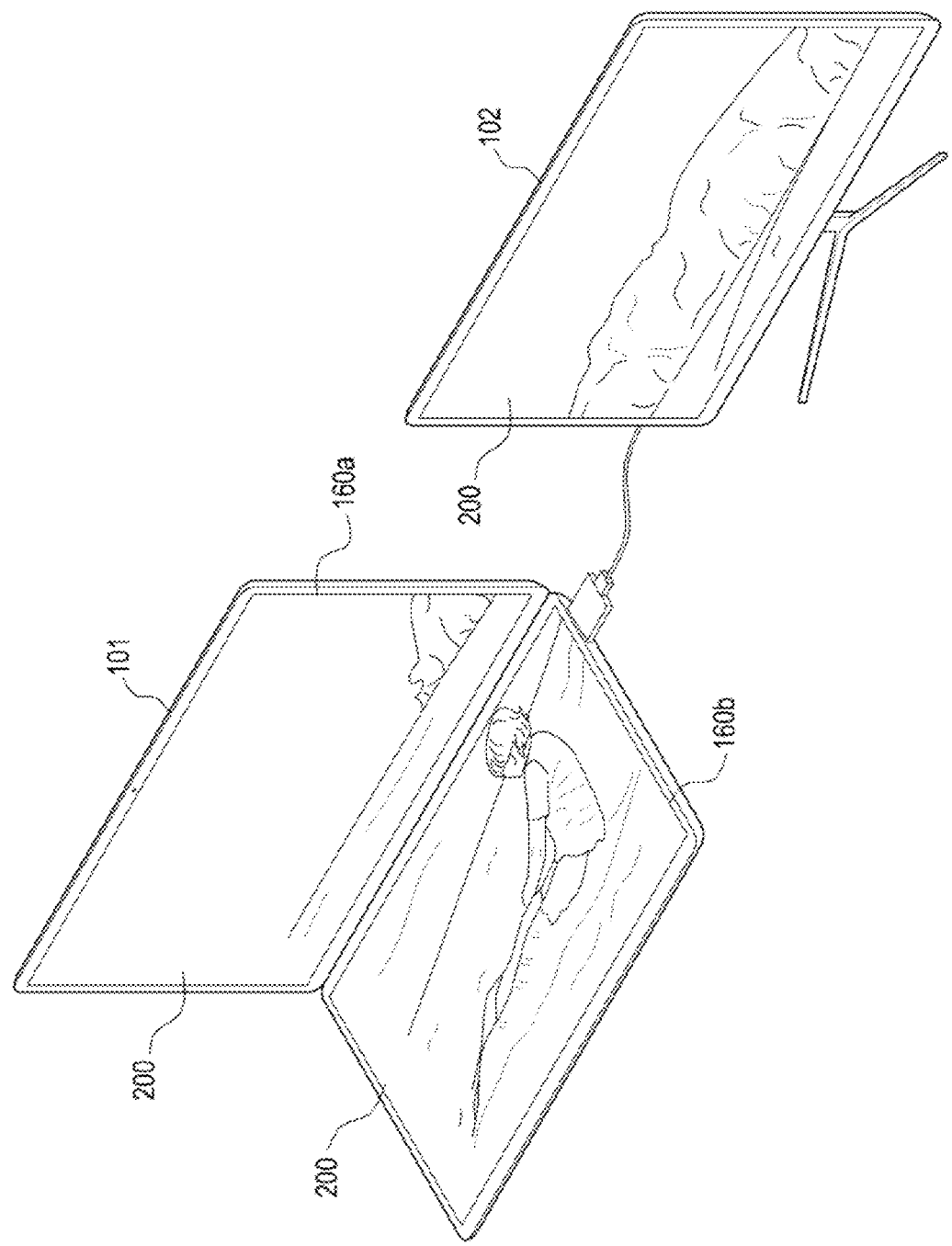

Referring to FIG. 10C, the electronic device 101 may switch to normal tablet mode and may display a screen corresponding to normal tablet mode in the internal displays 160a and 160b and the electronic device 102 according to the selection input 1001a. Referring to FIG. 10D, the electronic device 101 (e.g., the processor 120 of FIG. 1) may receive selection input 1001b for entering extended tablet mode. Referring to FIG. 10E, the electronic device 101 may switch to the extended tablet mode and may display the first screen 200, corresponding to the extended tablet mode on the internal displays 160a and 160b and the electronic device 102, according to the selection input 1001b. FIG. 10E illustrates an embodiment in which the parts of a single predetermined object are visually connected and displayed (i.e., continuously displayed) on the internal displays 160a and 160b and the electronic device 102 in extended tablet mode.

Figure 11A:
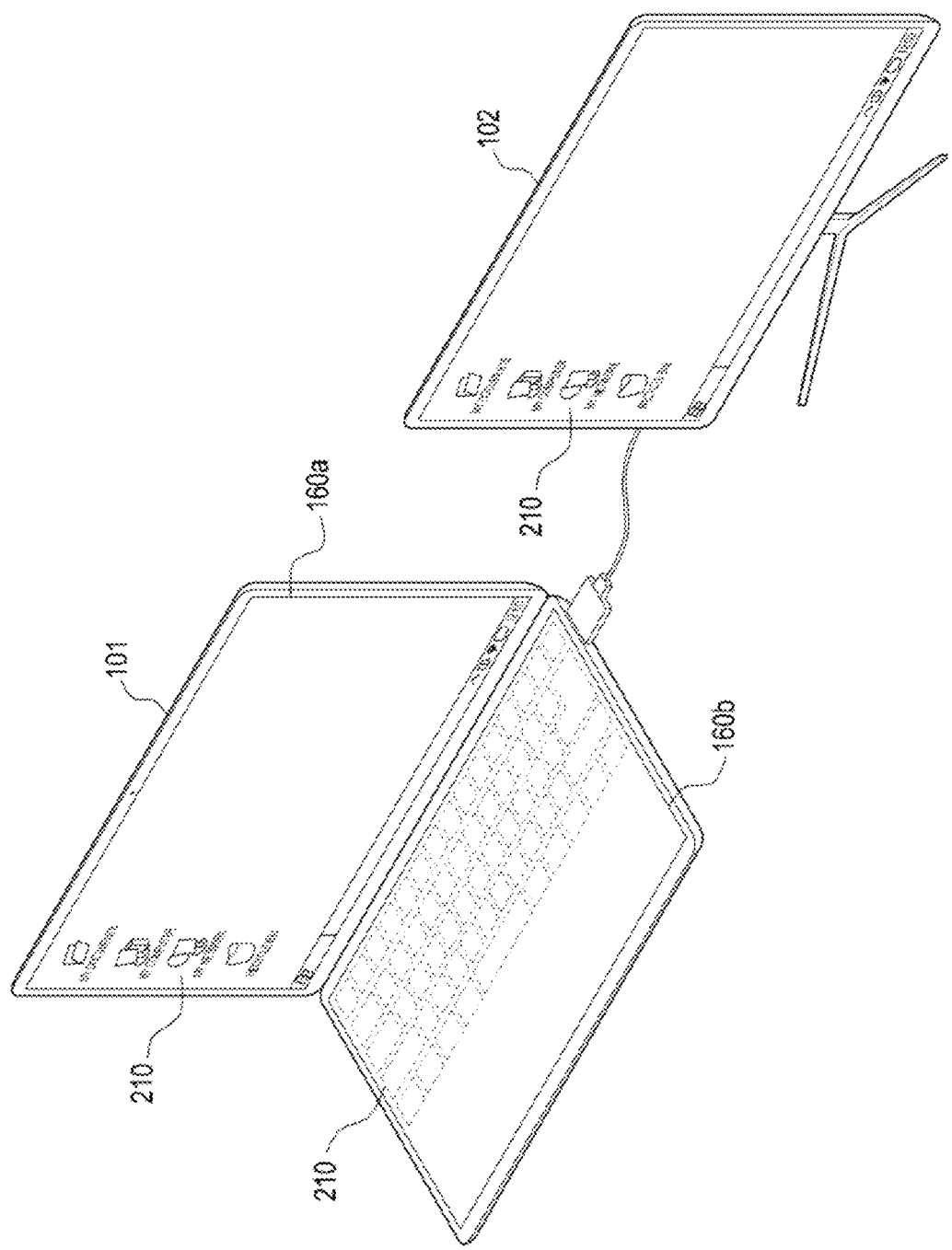
FIGS. 11A to 11C are diagrams illustrating a function/functions or an operation/operations of switching to a tablet mode from a desktop mode when an external display is disconnected from an electronic device, according to various embodiments.
Figure 11B:
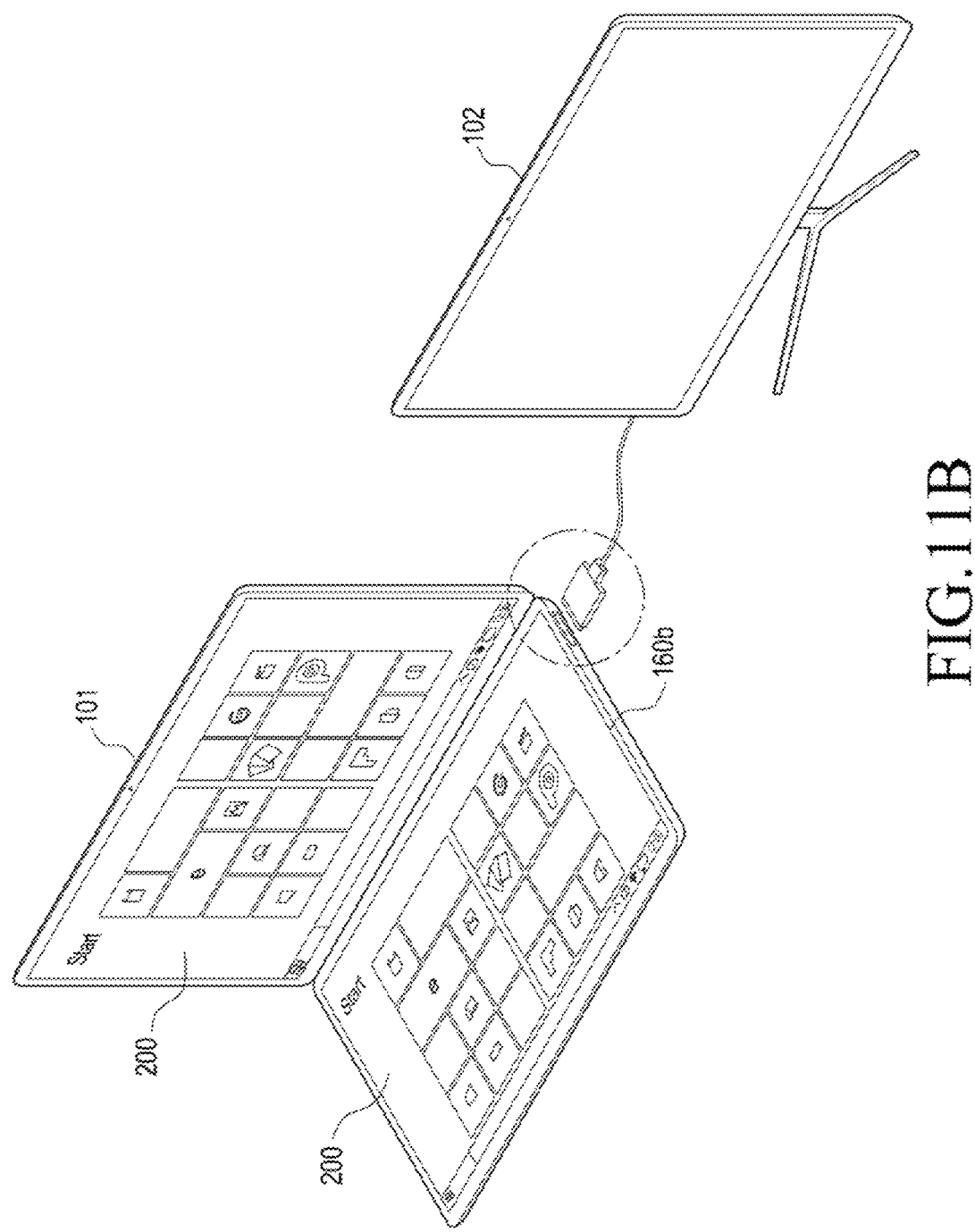
Figure 11C:
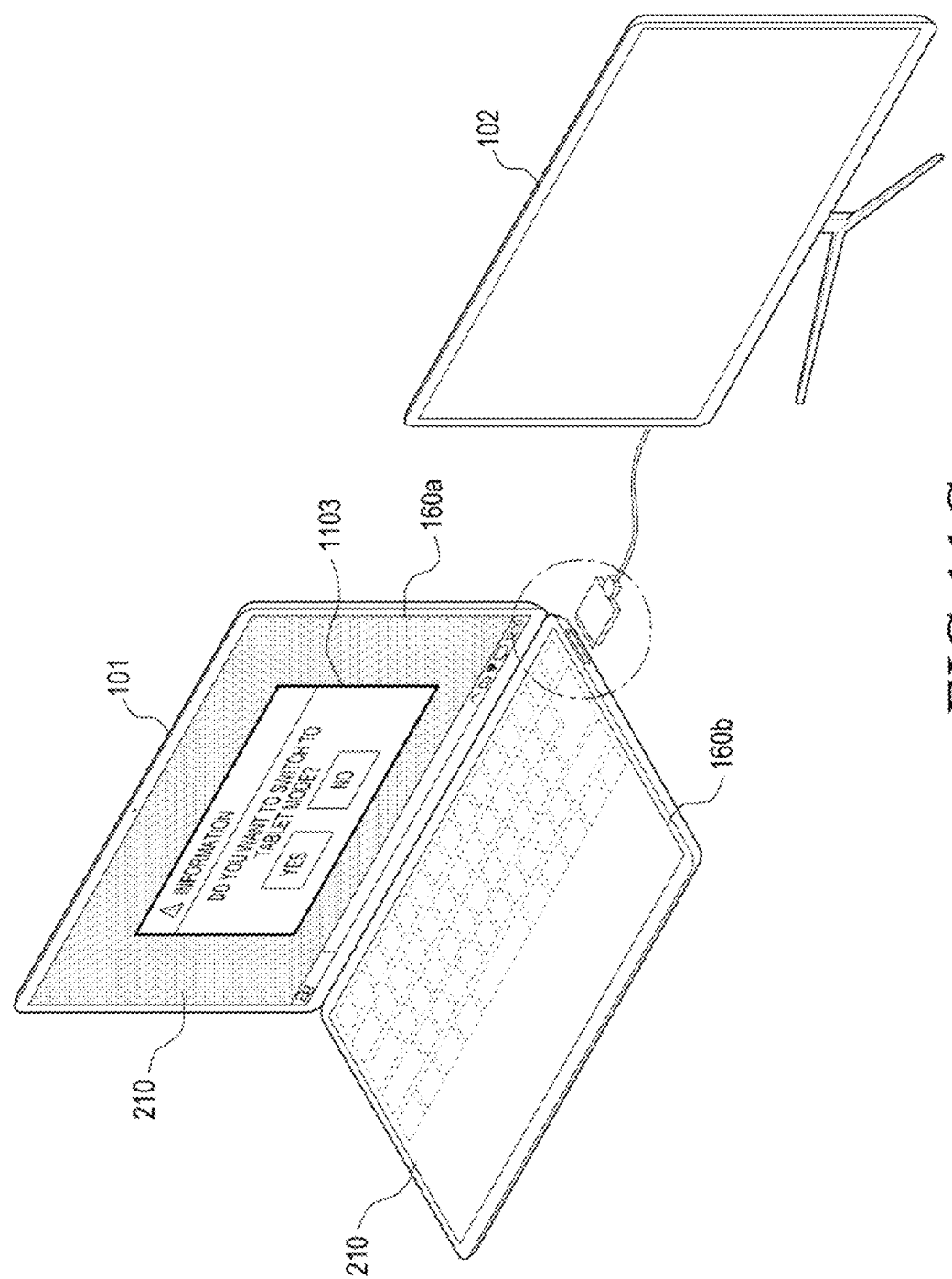

FIGS. 11A to 11C are diagrams illustrating a function/functions or an operation/operations of switching to a tablet mode from a desktop mode when an external display is disconnected from an electronic device according to various embodiments.

Referring to FIG. 11A, the electronic device 102 may be connected to the electronic device 101. According to various embodiments, as illustrated in FIG. 11A, when it is detected that the electronic device 102 is connected, the electronic device 101 may control the electronic device 101 and the electronic device 102 such that the second screen 210 is displayed via the electronic device 101 and the electronic device 102.

Referring to FIG. 11B, as illustrated in FIG. 11B, in the state in which the electronic device 102 is connected to the electronic device 101, the electronic device 102 may be disconnected from the electronic device 101. When it is detected that the electronic device 102 is disconnected, the electronic device 101 (e.g., the processor 120 of FIG. 1) may not display a switch confirmation message associated with mode switching (e.g., a switch confirmation message 1103), but may switch to tablet mode from desktop mode.

Referring to FIG. 11C, when it is detected that the electronic device 102 is disconnected, the electronic device 101 may display the switch confirmation message 1103 on at least one of the internal displays 160a and 160b. The electronic device 101 may receive input on the switch confirmation message 1103 and may perform a function/operation corresponding to the received input.

Figure 12A:
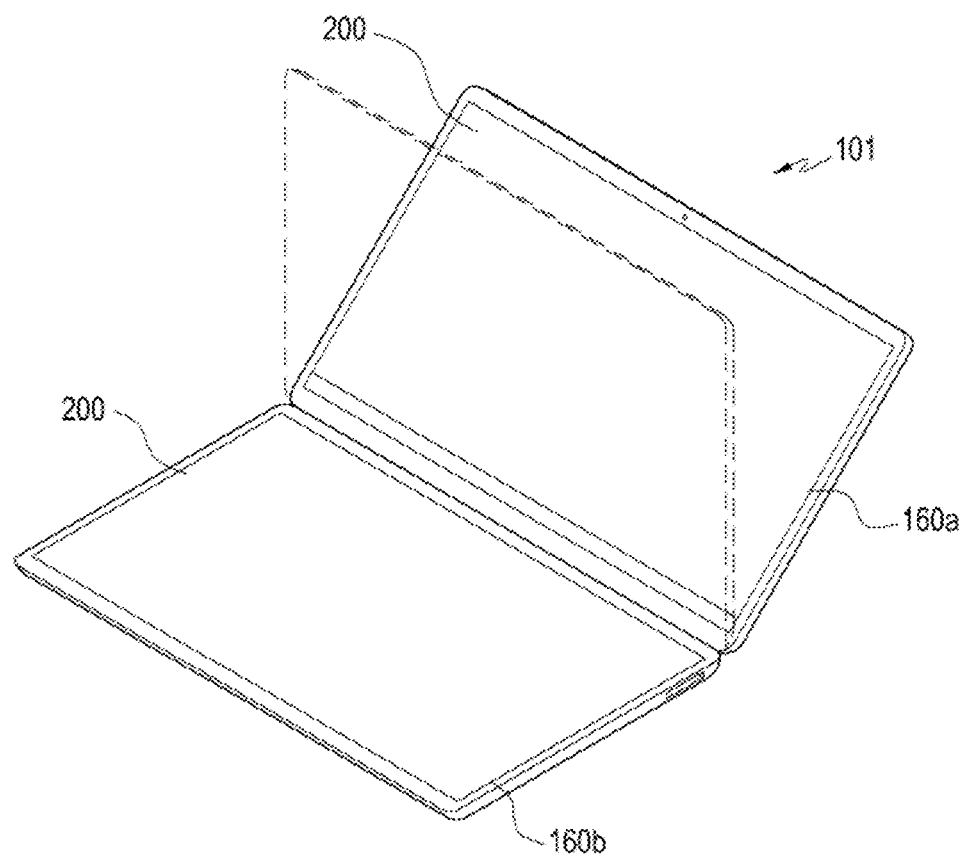
FIGS. 12A and 12B are diagrams illustrating a function/functions or an operation/operations of switching to a tablet mode from a desktop mode because an electronic device moves or is separated, according to various embodiments.
Figure 12B:
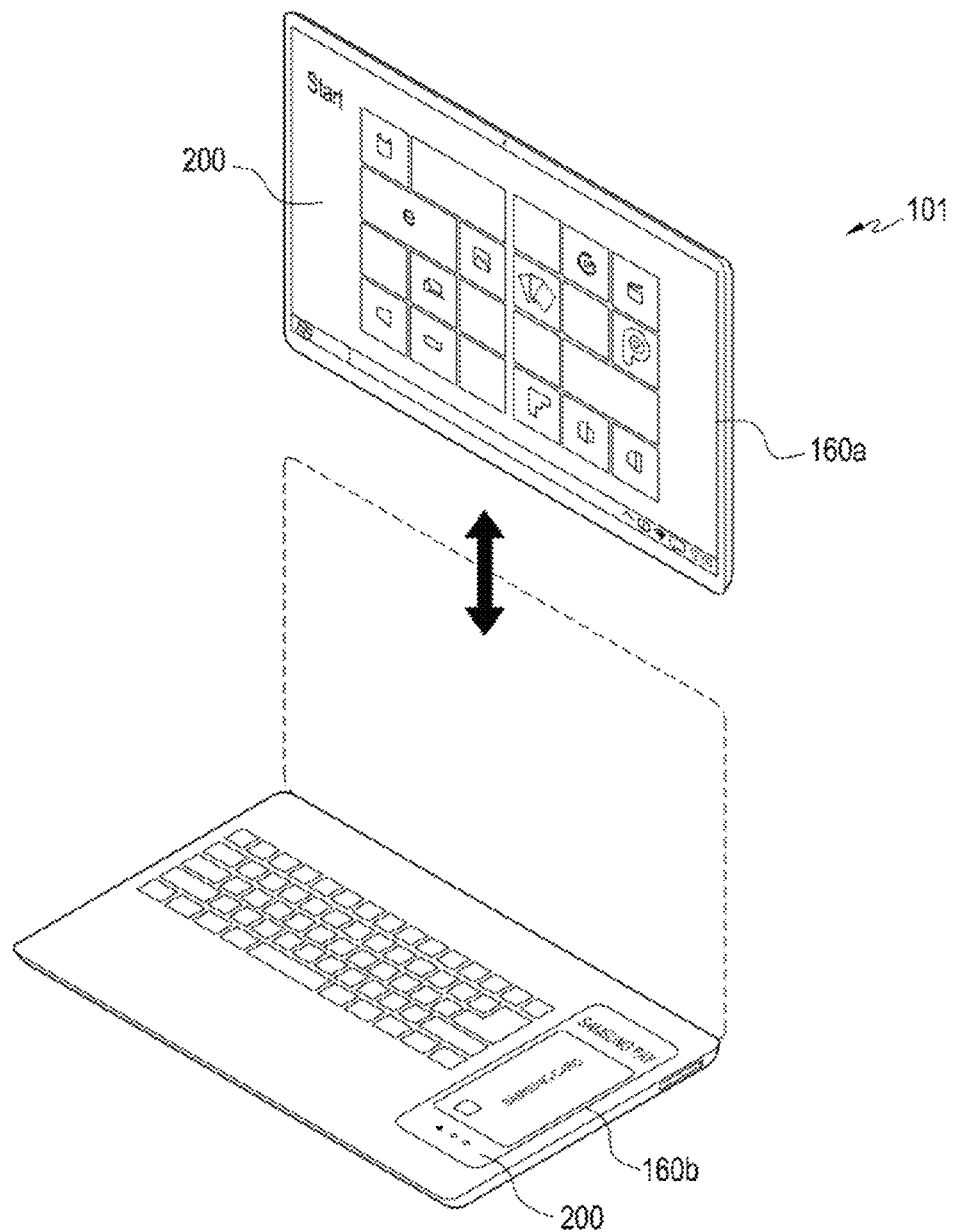

FIGS. 12A and 12B are diagrams illustrating a function/functions or an operation/operations of switching to a tablet mode from a desktop mode because an electronic device moves or is separated, according to various embodiments.

Referring to FIG. 12A, the electronic device 101 may be provided in a structure in which the upper portion (the upper portion 101a of FIG. 2) of the electronic device 101 and the lower portion (the lower portion 101b of FIG. 2) are coupled via hinge coupling, and the angle between the upper portion and the lower portion may be changed in various ways. While the electronic device 101 operates in the desktop mode, when it is detected that the angle between the upper portion and the lower portion exceeds a designated angle (e.g., 150 degrees), the electronic device 101 may switch to tablet mode from desktop mode, and may display the first screen 200 on the internal displays 160a and 160b.

Referring to FIG. 12B, according to various embodiments, the upper portion and the lower portion of the electronic device 101 may be configured to be separable from each other. For example, the electronic device 101 may be manufactured in the form of a convertible notebook, such that the upper portion and the lower portion of the electronic device 101 are capable of being separated from each other. According to various embodiments, when it is detected that the upper portion and the lower portion are separated, the electronic device 101 may switch to tablet mode from desktop mode, and may display the first screen 200.

Although the present disclosure describes embodiments in which the electronic device 101 includes two displays, the embodiments are merely examples. According to various embodiments, the electronic device 101 may have three or more displays.

Figure 13:
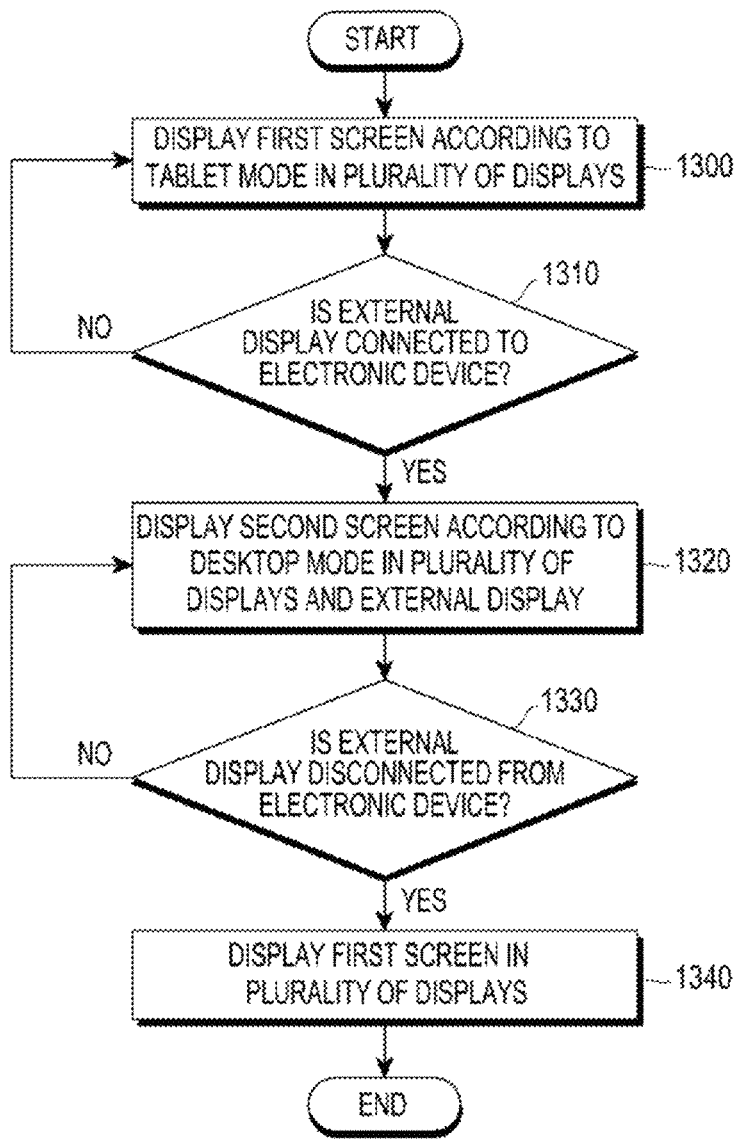
FIG. 13 is a diagram illustrating a method of operating an electronic device according to various embodiments.

FIG. 13 is a diagram illustrating a method of operating an electronic device according to various embodiments.

According to various embodiments, in operation 1300, the electronic device 101 (e.g., the processor 120 of FIG. 1) may display the first screen 200 according to the tablet mode on a plurality of displays.

According to various embodiments, in operation 1310, the electronic device 101 (e.g., the processor 120 of FIG. 1) may determine whether an external display is connected to the electronic device 101.

According to various embodiments, in operation 1320, when the external display is connected to the electronic device 101 (e.g., the processor 120 of FIG. 1), the electronic device 101 may switch to desktop mode, and may display a second screen (e.g., the second screen 210 of FIG. 2C) according to desktop mode on the plurality of displays 160*a* and 160*b*, and the external display.

According to various embodiments, in operation 1330, the electronic device 101 (e.g., the processor 120 of FIG. 1) may determine whether the external display is disconnected from the electronic device 101.

According to various embodiments, in operation 1340, when the external display is disconnected from the electronic device 101 (e.g., the processor 120 of FIG. 1), the electronic device 101 may switch to tablet mode from desktop mode, and may display the first screen (e.g., the first screen 200 of FIG. 2B) in the plurality of displays.

An electronic device (e.g., the electronic device 101 of FIG. 1) according to various embodiments may include a housing, a processor (e.g., the processor 120 of FIG. 1) disposed in the housing, and at least one memory disposed in the housing and connected to the processor (e.g., the processor 120 of FIG. 1) so as to be operable, and upon execution, the memory may enable the processor (e.g., the processor 120 of FIG. 1) to perform: detecting connection of a plurality of displays to the processor (e.g., the processor 120 of FIG. 1); determining connection types of the plurality of connected displays; based at least on a result of the determination, displaying a first screen (e.g., the first screen 200 of FIG. 2B) according to a first mode in the plurality of displays when all of the plurality of connected displays are internal displays (e.g., the first display 160*a* and the second display 160*b*) that are exposed via at least a part of the housing; and based at least on a result of the determination, displaying a second screen (e.g., the second screen 210 of FIG. 2C) according to a second mode in the plurality of displays when at least some of the plurality of connected displays are internal displays and the remaining displays are external displays (e.g., the electronic device 102) connected to the electronic device (e.g., the electronic device 101 of FIG. 1) via an interface, a part of which is exposed via the housing.

According to various embodiments, the first mode may include a tablet mode, and the second mode may include a desktop mode.

According to various embodiments, the internal displays (e.g., the first display 160*a* and the second display 160*b*) are connected to the processor (e.g., the processor 120 of FIG. 1) according to an embedded display port scheme.

According to various embodiments, the external display (e.g., the electronic device 102) is connected to the processor (e.g., the processor 120 of FIG. 1) via wired communication or wireless communication so as to be operable.

According to various embodiments, when the occurrence of a mode-switching event is detected while the second screen (e.g., the second screen 210 of FIG. 2C) is displayed, the processor (e.g., the processor 120 of FIG. 1) switches to the first mode so as to display the first screen (e.g., the first screen 200 of FIG. 2B).

According to various embodiments, the mode-switching event may include a selection input event associated with a switch icon displayed in at least some of the plurality of displays, or a selection input event associated with a switch confirmation message displayed on at least some of the plurality of displays when the external display (e.g., the electronic device 102) is connected.

According to various embodiments, when the occurrence of a mode-switching event is detected while the first screen (e.g., the first screen 200 of FIG. 2B) is displayed, the processor (e.g., the processor 120 of FIG. 1) may display the second screen (e.g., the second screen 210 of FIG. 2C).

According to various embodiments, the mode-switching event may include a selection input event associated with a switch icon displayed in at least some of the plurality of displays, a selection input event associated with a switch confirmation message displayed in at least some of the plurality of displays when the external display (e.g., the electronic device 102) is disconnected, and a connection event for connecting a sub-electronic device to the electronic device (e.g., the electronic device 101 of FIG. 1).

According to various embodiments, the processor (e.g., the processor 120 of FIG. 1) may display the second screen (e.g., the second screen 210 of FIG. 2C) on the internal displays (e.g., the first display 160*a* and the second display 160*b*) when all of the plurality of connected displays are internal displays (e.g., the first display 160*a* and the second display 160*b*), and may switch to the first mode and may display the first screen (e.g., the first screen 200 of FIG. 2B) on the internal displays (e.g., the first display 160*a* and the second display 160*b*) when the occurrence of a mode-switching event for the electronic device (e.g., the electronic device 101 of FIG. 1) is detected.

According to various embodiments, the processor (e.g., the processor 120 of FIG. 1) may configure the same video BIOS (VBIOS) for the internal displays (e.g., the first display 160*a* and the second display 160*b*).

A computer-readable recoding medium according to various embodiments may include at least one operation, and the at least one operation may include: detecting the connection of a plurality of displays to the processor (e.g., the processor 120 of FIG. 1); determining connection types of the plurality of connected displays; based at least on a result of the determination, displaying a first screen (e.g., the first screen 200 of FIG. 2B) according to a first mode on the plurality of displays when all of the plurality of connected displays are internal displays (e.g., the first display 160*a* and the second display 160*b*) exposed via at least a part of the housing, and displaying a second screen (e.g., the second screen 210 of FIG. 2C) according to a second mode on the plurality of displays when some of the plurality of displays are internal displays (e.g., the first display 160*a* and the second display 160*b*) and the remaining displays are external displays (e.g., the electronic device 102) connected to the electronic device (e.g., the electronic device 101 of FIG. 1) via an interface, at least a part of which is exposed via the housing.

An electronic device (e.g., the electronic device 101 of FIG. 1) according to various embodiments may include a housing, a processor (e.g., the processor 120 of FIG. 1) disposed in the housing, a plurality of displays disposed in the housing and connected to the processor (e.g., the processor 120 of FIG. 1) according to an embedded display port scheme so as to be operable, and at least one memory disposed in the housing, and connected to the processor (e.g., the processor 120 of FIG. 1), so as to be operable, and, upon execution, the memory is configured to enable the processor (e.g., the processor 120 of FIG. 1) to perform:

displaying a first screen (e.g., the first screen 200 of FIG. 2B) according to a tablet mode in the plurality of displays; determining whether an external display (e.g., the electronic device 102) is connected to the electronic device (e.g., the electronic device 101 of FIG. 1); when the external display (e.g., the electronic device 102) is connected to the electronic device (e.g., the electronic device 101), switching from the tablet mode to a desktop mode, and displaying a second screen (e.g., the second screen 210 of FIG. 2C) according to the desktop mode in the plurality of displays and the external display (e.g., the electronic device 102); and when the external display (e.g., the electronic device 102) is disconnected from the electronic device (e.g., the electronic device 101 of FIG. 1), switching from desktop mode to tablet mode and displaying the first screen (e.g., the first screen 200 of FIG. 2B) in the plurality of displays.

An electronic device, according to various embodiments disclosed herein, may be various types of devices. The electronic device may, for example, include at least one of a portable communication device (e.g., smartphone) a computer device, a portable multimedia device, a portable medical device, a camera, a wearable device, and a home appliance. The electronic device according to embodiments of the present disclosure is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a housing;
a processor disposed in the housing; and
a memory disposed in the housing, connected to the processor, and storing instructions that, when executed by the processor, cause the processor to:
identify a plurality of displays connected to the processor;
display a first screen according to a first mode in all of the plurality of displays when the plurality of displays are internal displays disposed in the housing; and
display a second screen according to a second mode in all of the plurality of displays when at least one of the plurality of displays is an internal display and at least one of the plurality of displays is an external display connected to the electronic device via an interface disposed in the housing, wherein the second screen according to the second mode is displayed both in the internal display and the external display respectively,
wherein the first screen includes a screen on which a part, and a remaining part of a single predetermined object, are visually and contiguously displayed on the internal displays,
wherein the first mode is an extended tablet mode and the second mode is a normal tablet mode, and
wherein, when a mode-switching event is detected while the first screen is displayed, the instructions cause the processor to switch to the second mode to display the second screen, wherein the mode-switching event includes a selection input event associated with a switch confirmation message displayed in at least one of the plurality of displays when the external display is disconnected, and a connection event for connecting a sub-electronic device to the electronic device.

2. The electronic device of claim 1, wherein the internal display is connected to the processor using an embedded display port scheme.

3. The electronic device of claim 1, wherein the external display is connected to the processor via wired communication or wireless communication.

4. The electronic device of claim 1, wherein, when a mode-switching event is detected while the second screen is displayed, the processor is configured to switch to the first mode to display the first screen.

5. The electronic device of claim 4, wherein the mode-switching event includes at least one of (i) a selection input event associated with a switch icon displayed in at least one of the plurality of displays or (ii) a selection input event associated with a switch confirmation message displayed in at least one of the plurality of displays when the external display is connected.

6. The electronic device of claim 1, wherein the instructions cause the processor to switch to the first mode to display the first screen in the plurality of displays when a mode-switching event for the electronic device is detected while the second screen is displayed in the plurality of displays.

7. The electronic device of claim 1, wherein the same video basic input/output system (VBIOS) is used for each of the internal displays.

8. A non-transitory computer-readable recording medium storing instructions that, when executed by a processor, cause the processor to:
 identify a plurality of displays connected to the processor;
 display a first screen according to a first mode in all of the plurality of displays when the plurality of displays are internal displays that are disposed in a housing;
 display the first screen according to the first mode in all of the plurality of displays when all of the plurality of displays are internal displays; and
 display a second screen according to a second mode in all of the plurality of displays when at least one of the plurality of displays is an internal display and at least one of the plurality of displays is an external display connected to an electronic device via an interface disposed in the housing, wherein the second screen according to the second mode is displayed both in the internal display and the external display respectively,
 wherein the first screen includes a screen on which a part, and a remaining part of a single predetermined object, are visually and contiguously displayed on the internal displays,
 wherein the first mode is an extended tablet mode and the second mode is a normal tablet mode, and
 wherein, when a mode-switching event is detected while the first screen is displayed, the instructions cause the processor to switch to the second mode to display the second screen, wherein the mode-switching event includes a selection input event associated with a switch confirmation message displayed in at least one of the plurality of displays when the external display is disconnected, and a connection event for connecting a sub-electronic device to the electronic device.

9. The non-transitory computer-readable recording medium of claim 8, wherein the internal display is connected to the processor using an embedded display port scheme.

10. The non-transitory computer-readable recording medium of claim 8, wherein the external display is connected to the processor via wired communication or wireless communication.

11. The non-transitory computer-readable recording medium of claim 8, wherein the non-transitory computer-readable recording medium further stores the instructions that, when executed by the processor, cause the processor to switch to the first mode to display the first screen when a mode-switching event is detected while the second screen is displayed.

12. The non-transitory computer-readable recording medium of claim 11, wherein the mode-switching event includes at least one of (i) a selection input event associated with a switch icon displayed in at least one of the plurality of displays or (ii) a selection input event associated with a switch confirmation message displayed in at least one of the plurality of displays.

13. The non-transitory computer-readable recording medium of claim 8, wherein the computer-readable recording medium further stores instructions that, when executed by the processor, cause the processor to configure the same video basic input/output system (VBIOS) for each of the internal displays.

* * * * *